United States Patent [19]
Yamaguchi et al.

[11] Patent Number: 5,276,853
[45] Date of Patent: Jan. 4, 1994

[54] CACHE SYSTEM

[75] Inventors: Kazue Yamaguchi, Yokohama; Hideki Osone, Tokyo, both of Japan

[73] Assignee: Fujitsu Limited, Kawasaki, Japan

[21] Appl. No.: 47,386

[22] Filed: Apr. 16, 1993

Related U.S. Application Data

[63] Continuation of Ser. No. 719,061, Jun. 19, 1991, abandoned, which is a continuation of Ser. No. 193,530, May 13, 1988, abandoned.

[30] Foreign Application Priority Data

May 18, 1987 [JP] Japan .................. 62-120602

[51] Int. Cl.⁵ .................................. G06F 13/14
[52] U.S. Cl. .................. 395/425; 364/244.8; 364/243.4; 364/DIG. 1
[58] Field of Search ...................... 395/425

[56] References Cited

U.S. PATENT DOCUMENTS

| | | | |
|---|---|---|---|
| 4,434,459 | 2/1984 | Holland | 364/200 |
| 4,439,829 | 3/1984 | Tsiang | 364/200 |
| 4,493,033 | 1/1985 | Ziegler | 364/200 |
| 4,551,799 | 11/1985 | Ryan et al. | 364/200 |
| 4,695,943 | 9/1987 | Keeley | 364/200 |
| 4,707,784 | 11/1987 | Ryan et al. | 364/200 |
| 4,755,930 | 7/1988 | Wilson et al. | 364/DIG. 1 |
| 4,835,678 | 5/1989 | Kofuji | 364/200 |
| 4,914,576 | 4/1990 | Zelley | 364/200 |

FOREIGN PATENT DOCUMENTS 0039277 4/1981 European Pat. Off. .

OTHER PUBLICATIONS

Per Knudsen, "Supermini goes multiprocessor route to put it up front in performance", 8032 Electronics International, vol. 55 (1982) Aug. No. 16, New York, USA, pp. 112-117.

Primary Examiner—Lawrence E. Anderson
Attorney, Agent, or Firm—Staas & Halsey

[57] ABSTRACT

A cache system having a plurality of read-in ports through which data fetched from a main memory system can be transferred regardless of the type of the data fetch request. Further, each data fetch request is output from an available read-in port, during the data fetch operation for a previous data fetch request of the same type.

10 Claims, 18 Drawing Sheets

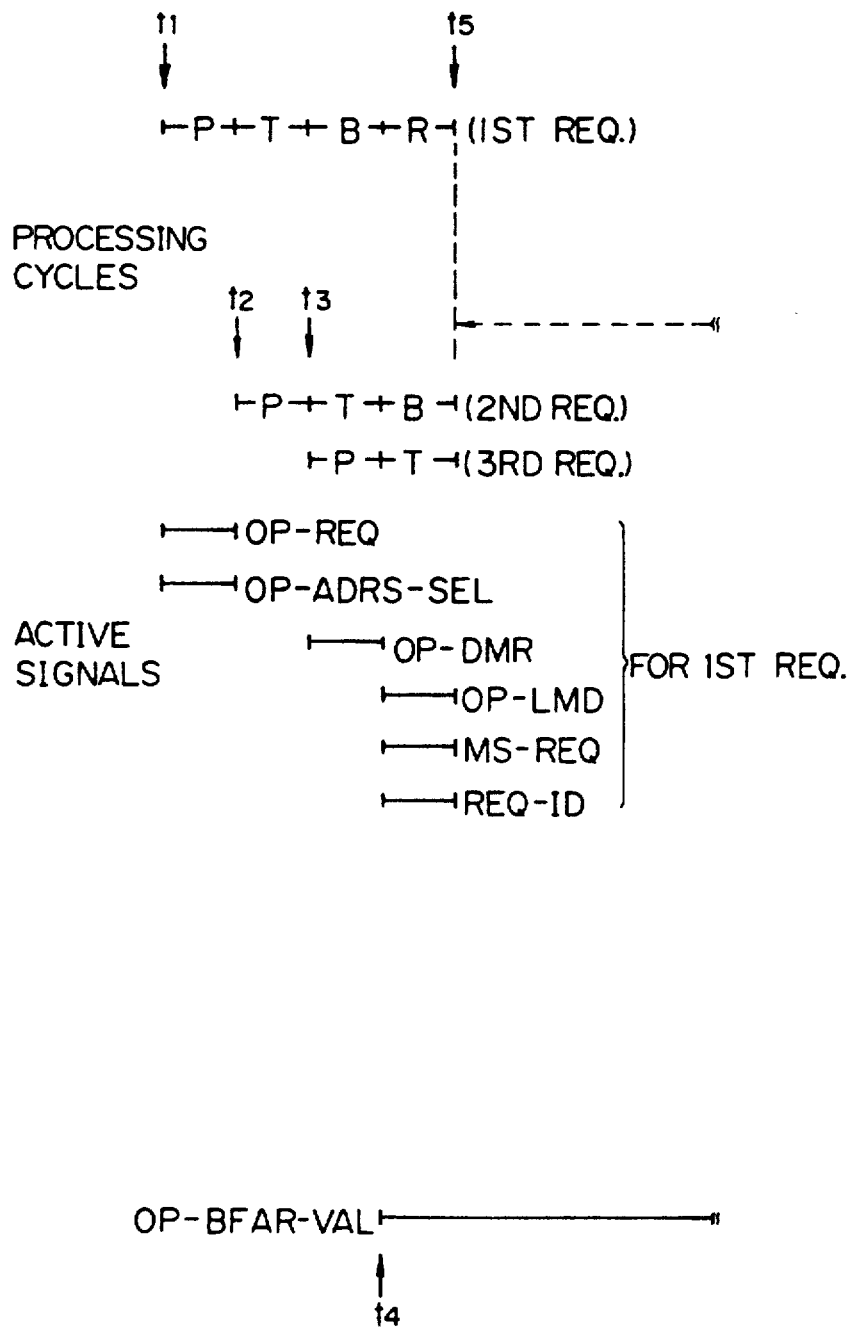

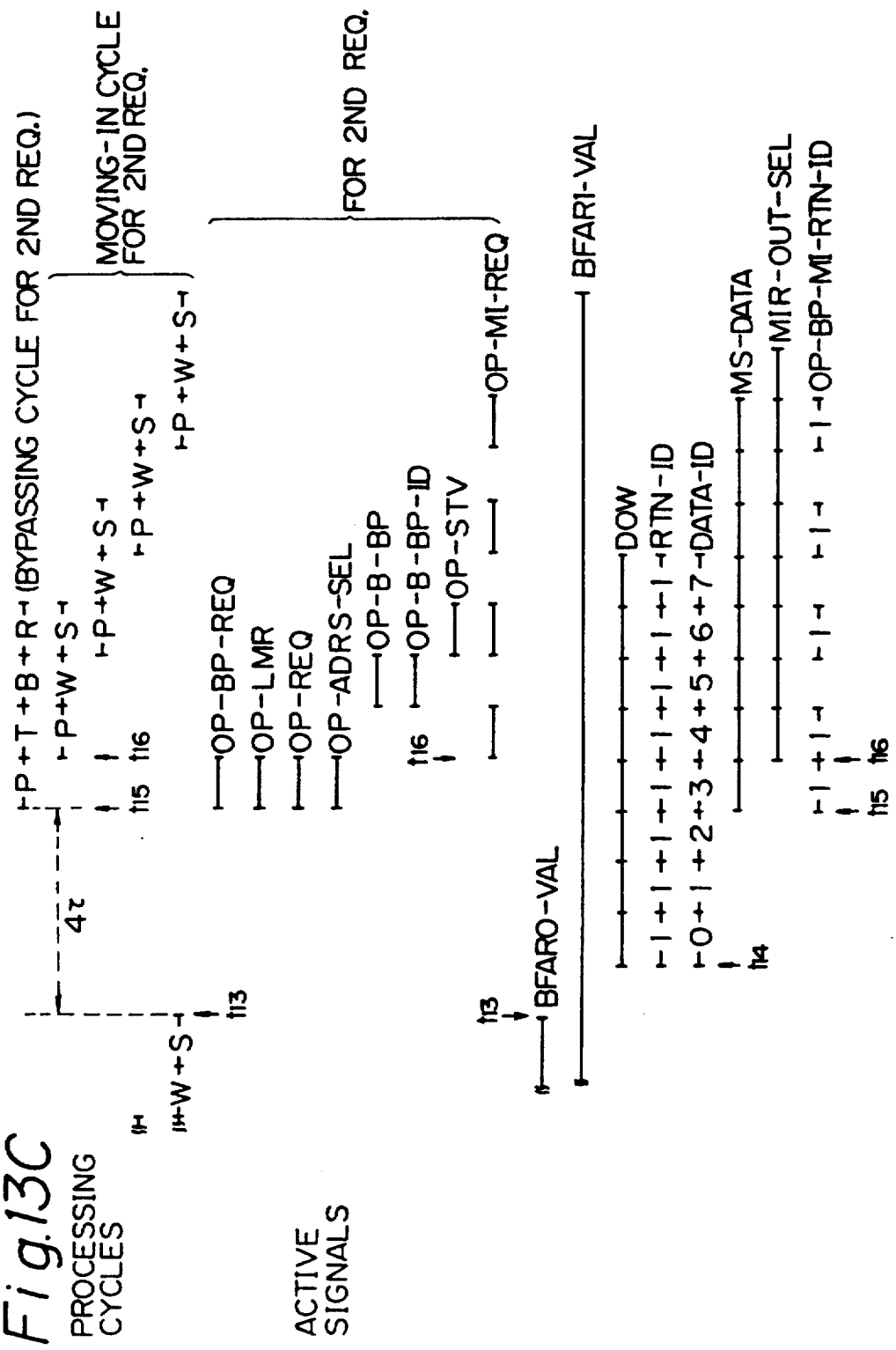

CACHE SYSTEM

This application is a continuation of application Ser. No. 07/719,061, filed Jun. 19, 1991, now abandoned, which is a continuation of application Ser. No. 07/193,530, filed on May 13, 1988, now abandoned.

BACKGROUND OF THE INVENTION

(1) Field of the Invention

The present invention relates to a cache system. A cache system is provided to speed up operations in central processing unit (CPU).

(2) Description of the Related Art

In general, a cache system comprises a cache (or caches) having an access time shorter than the main memory, and temporarily storing a part of the content of the main memory. The CPU first attempts to fetch the necessary data to execute operations from the cache. However, if the necessary data does not exist in the cache (a miss-hit occurs), a block of data which includes the necessary data is transferred from the main memory to the cache.

In the prior art, the cache system is provided with one fixed port for each type of data fetch, through which a block of data is transferred from the main memory system, when a miss-hit occurs. For example, in some types of data processing system, four types of data fetch requests are generated in the CPU, i.e., an instruction fetch request, an operand fetch request, a prefetch request, and an address translation buffer request. For each type of data fetch request, one fixed port is provided exclusively.

However, in the cache system as mentioned above, when, for example, the same type of the data fetch requests and miss-hits thereof in the cache frequently occur. Any request for transferring a block of data from the main memory corresponding to the following miss-hit which occurred on the following data fetch request, can not be accepted until the transfer of a block of data from the main memory on the previous data fetch request is completed, as only one port is available for the same type of data fetch request. Therefore, after the transfer of the block of data for the previous data fetch request is completed, then the following request for transfer of a block of data is sent to the main memory system, and after a certain access time has elapsed in the main memory system, the block of data for the following data fetch request is transferred to the cache system.

The data fetch requests of the same type are often generated successively in the CPU. For example, in a computer system in which pipe-line processing is executed, an instruction fetch request and an operand fetch request can be generated at every cycle, because an execution of a simple instruction is commenced at every cycle, but the data requested by the instruction or operand fetch requests successively generated often do not exist in the caches. Accordingly, successive fetches of blocks of data from the main storage (MS) 3 often become necessary.

In the above situation, although some time must be allowed for the data fetch operation from the main storage (MS) 3, the problem is that when the successive block fetches from the main storage (MS) 3 become necessary in the cache system in which only one port is provided for each type of data fetch request, the following block fetch operation can not be commenced until the previous block fetch operation is completed. Further, the time necessary to complete the block fetch operation includes the time for writing (move-in) the block of the data fetched from the main storage (MS) 3 into the cache, this means that an unreasonable waiting time must be allowed before the commencement of the following block fetch operations.

Although the block fetch operation in the main storage (MS) 3 is carried out regardless of the type of the data fetch request from the CPU, the operations in the CPU differ depending on the type of data fetch requests. For example, the block data fetched for the operand fetch request must be written into the cache for the operands, and the block data fetched for the instruction fetch request must be written into the cache for the instructions, and in the operations for the operand or instruction fetch requests, the block data fetched for the operand or instruction requests also must be sent directly, i.e., bypassing the cache, to the execution or instruction unit; on the other hand, the block data fetched for a prefetch request need not be sent directly to the execution or instruction unit. Further, in the operations for data fetch requests for address translation, sometimes, the block data fetched for the requests is not written into the cache.

Therefore, in the cache system of the prior art, one port is provided for each type of data fetch request exclusively, so that, during the operation of the block fetch request for one type of data fetch request, the operation of another type of data fetch request can not be commenced. However, in the cache system of the prior art, the block fetch operations for the successive data fetch request of the type can not be carried out in parallel.

As stated above, cache systems in the prior art are not efficient in the case of transferring a block of data from the main memory system when a miss-hit occurs, for the data fetch requests of the same type, especially when miss-hits frequently occur for the data fetch requests of the same type.

SUMMARY OF THE INVENTION

The object of the present invention is to provide a cache system which enables an efficient transfer of a block of data from the main memory system when a miss-hit occurs for the data fetch requests of the same type, especially when mishits frequently occur for the data fetch requests of the same type.

According to the present invention, there is provided a cache system having a plurality of read-in ports through which data fetched from the main memory system can be input, regardless of the type of the data fetch request, and each of the data fetch requests can be sent out from the available read-in port, even during a data fetch operation for a previous data fetch request of the same type.

BRIEF DESCRIPTION OF THE DRAWING

In the drawings:

FIGS. 5A, 5B, and 5C show a timing relationship of the processing cycles and the main signals in the conventional cache system of FIGS. 3A, 3B and 4;

FIGS. 13A, 13B, and 13C show timing relationships for the processing cycles and the main signals in the cache system in the embodiment of the present invention.

DESCRIPTION OF THE PREFERRED EMBODIMENTS

Figure 1:
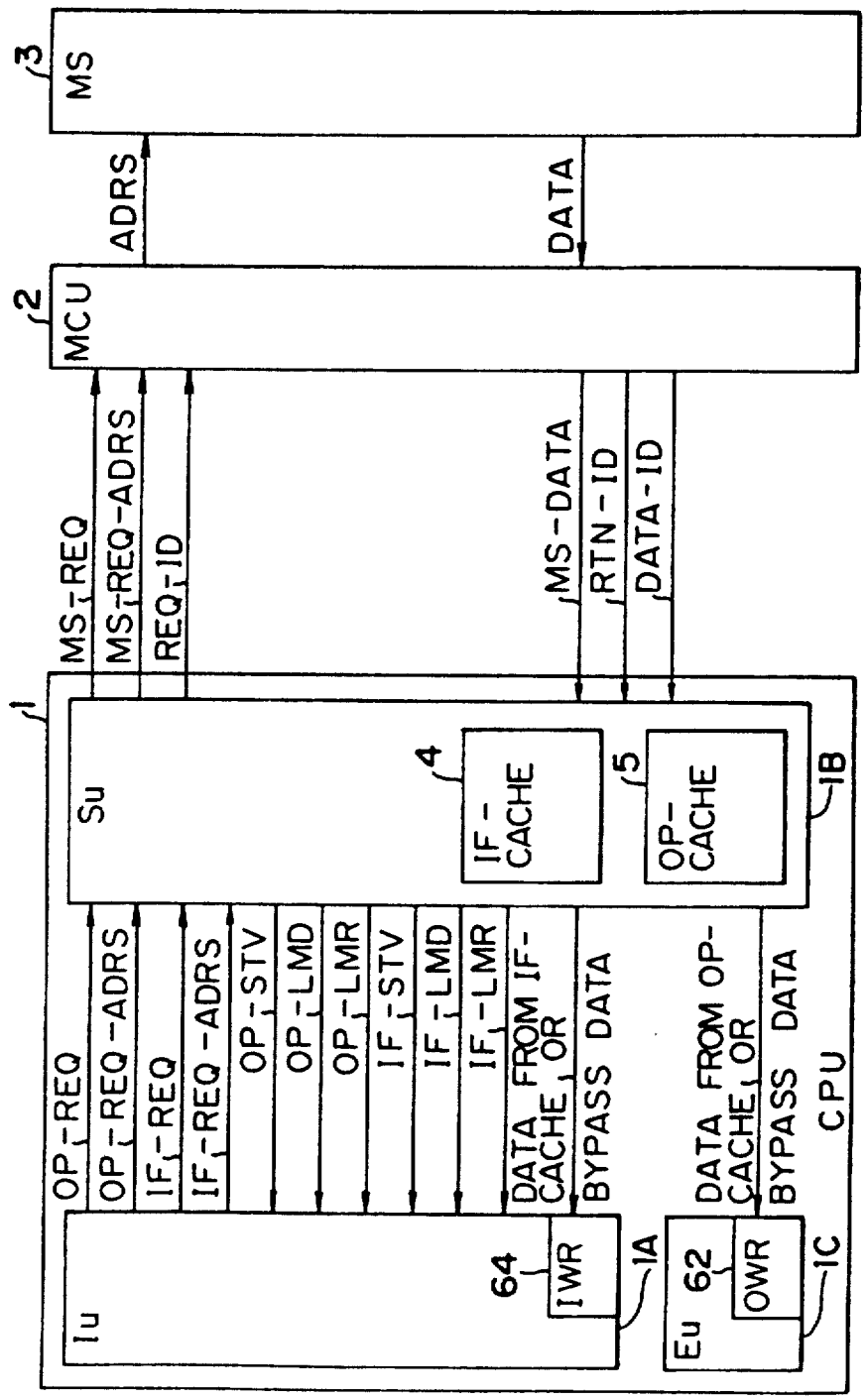
FIG. 1 shows an outline of the construction of the data processing system to which the present invention is applied.

FIG. 1 is a schematic diagram showing an outline of the construction of a part of a data processing system pertaining to a data fetch by the CPU, to which the present invention can be applied.

The part of the data processing system shown in FIG. 1, comprises: a central processing unit (CPU) 1, a memory control unit (MCU) 2, and a main storage (MS) 3. The CPU 1 comprises: an instruction unit (Iu) 1A, a storage control unit (Su) 1B, and an execution unit (Eu) 1C. Further, the instruction unit (Iu) 1A comprises an instruction word register (IWR) 64; the execution unit (Eu) 1C comprises an operand word register (OWR) 62; and the storage control unit (Su) 1B comprises two caches: one for an instruction fetch, denoted as IF CACHE 4; and the other for an operand fetch denoted as OP CACHE 5.

All data for the CPU 1, including instructions and the other data, is stored in the main storage (MS) 3. As mentioned before, the CPU 1 fetches instructions and operands from the main storage (MS) 3 in accordance with a execution program. The memory control unit (MCU) 2 generally controls the reading and writing operations of the main storage (MS) 3. In the CPU 1, the instruction unit (Iu) 1A inputs an instruction, holds the instruction at the instruction word register (IWR) 64, and then decodes and controls the execution of the instruction. Under the control of the instruction unit (Iu) 1A, the execution unit (Eu) 1C inputs an operand, holds the operand at the operand word register (OWR) 62, and executes an arithmetic or logic operation on the operands. The storage control unit (Su) 1B is provided for reading the data necessary in the instruction unit (Iu) 1A and the execution unit (Eu) 1C from the main storage (MS) 3, and for writing the results into the main storage (MS) 3. The main parts of the construction of the cache system are included in the storage control unit (Su) 1B.

Hereinafter in this specification, the preferred embodiment of the present invention is explained with comparison to a conventional cache system. The conventional cache system is first explained as follows.

Figure 2:
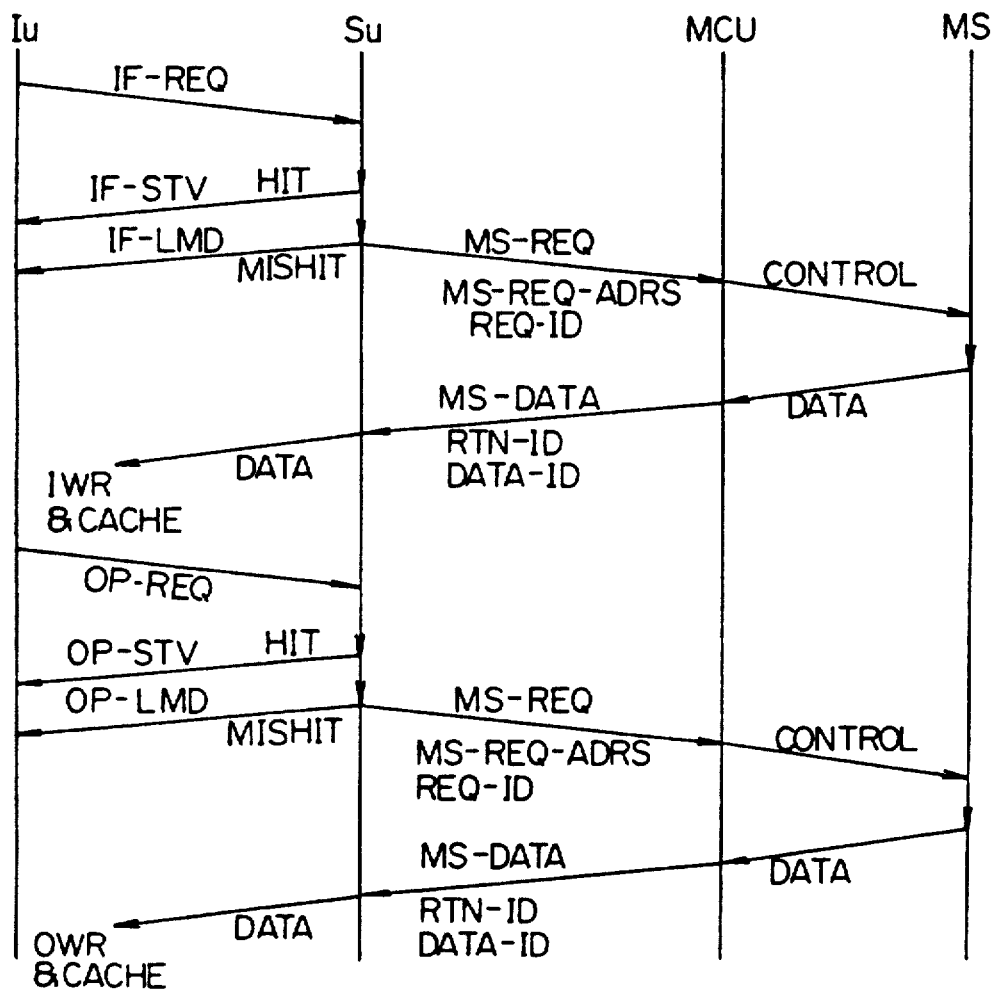
FIG. 2 shows the sequence of the main signals between the components in FIG. 1.

FIG. 2 shows the main signals between the components of the construction of FIG. 1, and the sequences of the signals, pertaining to a data fetch, more particularly, an instruction fetch and operand fetch. First, referring to FIG. 2, the main sequences of the conventional data fetch with a cache system are explained.

The sequence of a instruction fetch is started by a instruction fetch request (IF-REQ) sent from the instruction unit (Iu) 1A to the storage control unit (Su) 1B. If the instruction data requested by the instruction fetch request (IF-REQ) exists in the instruction fetch cache (IF CACHE 4) in the storage control unit (Su) 1B, i.e., a hit occurs, the storage control unit (Su) 1B sends an instruction fetch status valid signal (IF-STV) to the instruction unit (Iu) 1A. On the other hand, if the instruction data requested by the instruction fetch request (IF-REQ) does not exist in the instruction fetch cache (IF CACHE) 4, i.e., a miss-hit occurs, the storage control unit (Su) 1B sends an instruction fetch line missing detect signal (IF-LMD) to the instruction unit (Iu) 1A. At this time, the storage control unit (Su) 1B sends a main storage request signal (MS-REQ), with a main storage request address signal (MS-REQ-ADRS) and a request identifier (REQ-ID), to the memory control unit (MCU) 2. The main storage request address signal (MS-REQ-ADRS) has address information of the block of data which includes the instruction data first requested by the instruction unit (Iu) 1A; and the request identifier (REQ-ID) has information on the type of the data fetch, i.e., in this case, the request identifier (REQ-ID) indicates that this data fetch is an instruction fetch.

In accordance with the main storage request signal (MS-REQ), the memory control unit (MCU) 2 controls the main storage (MS) 3 to read out the block of data. Accordingly, the block of data are read out from the main storage (MS) 3, a few cycles after the time that a return identifier (RTN-ID) and a data identifier (DATA-ID) are output, where the return identifier (RTN-ID) has the same information as the corresponding request identifier (REQ-ID), and a data identifier (DATA-ID) indicates the number for identifying each set of data which is sent each cycle. A block of data is divided into a predetermined number of sets of data, and is sent by one set of data at each cycle, e.g., a block of data consisting of 64 bytes is sent in sets of 8 bytes of data per cycle for 8 cycles. In this case, the data identifier (DATA-ID) indicates 0,1,2, . . . 7 for each set of data.

The operand fetch sequence is just similar to the instruction fetch sequence but this case, the operand fetch sequence is started by an operand fetch request (OP-REQ) from the instruction unit (Iu) 1A to the storage control unit (Su) 1B. If the operand data requested by the operand fetch request (OP-REQ) exists in the operand fetch cache (OP CACHE) 5 in the storage control unit (Su) 1B, i.e., a hit occurs, the storage control unit (Su) 1B sends an operand fetch status valid signal (OP-STV) to the instruction unit (Iu) 1A. Otherwise, if the operand data requested by the operand fetch request (OP-REQ) does not exist in the operand fetch cache (OP CACHE) 5, i.e., a miss-hit occurs, the storage control unit (Su) 1B sends an operand fetch line missing detect signal (OP-LMD) to the instruction unit (Iu) 1A. At this time, the storage control unit (Su) 1B sends a main storage request signal (MS-REQ), with a main storage request address signal (MS-REQ-ADRS)

and a request identifier (REQ-ID) to the memory control unit (MCU) 2. The main storage request address signal (MS-REQ-ADRS) has address information of the block of data which includes the operand data first requested by the instruction unit (Iu) 1A, and the request identifier (REQ-ID) has information of the type of the data fetch, i.e., in this case, the request identifier (REQ-ID) indicates that this data fetch is an operand fetch.

In accordance with the main storage request signal (MS-REQ), the memory control unit (MCU) 2 controls the main storage (MS) 3 to read out a block of data, and accordingly, the block of data are read out from the main storage (MS) 3, a few cycles after the output of the corresponding return identifier (RTN-ID) and data identifier (DATA-ID).

Figure 3A:
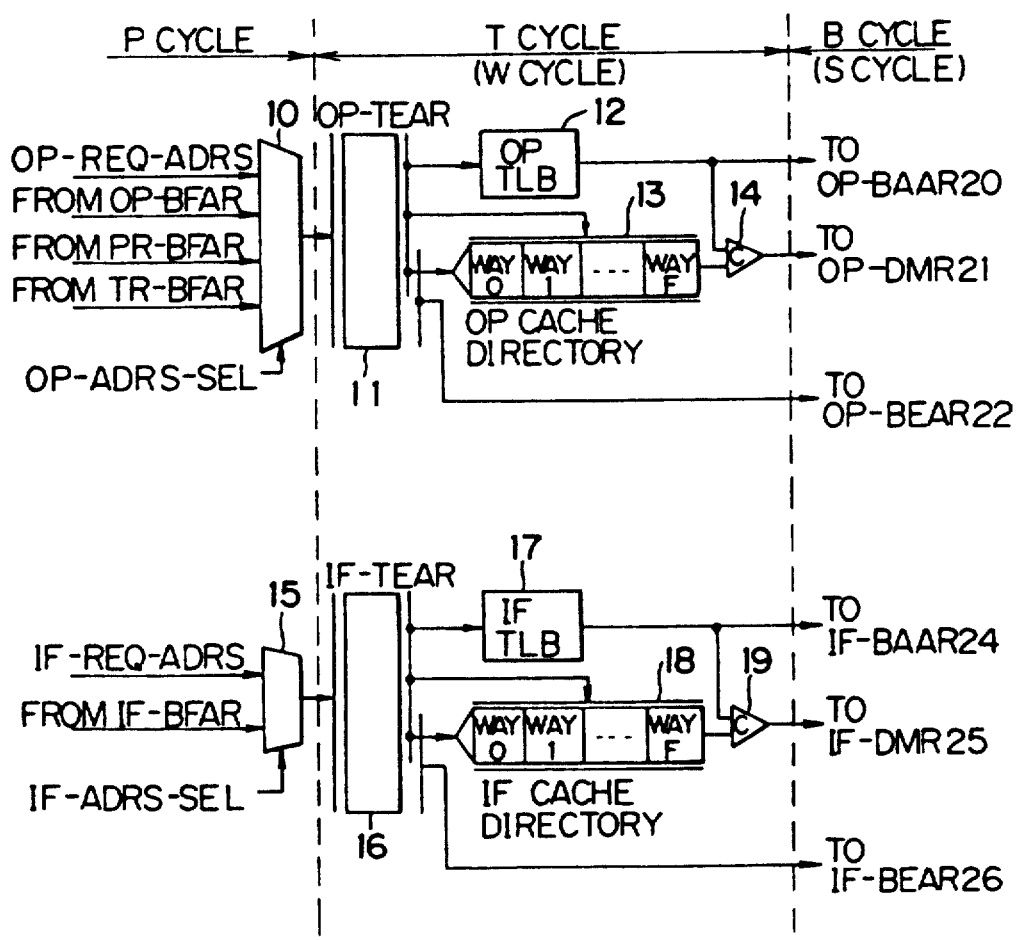
FIGS. 3A and 3B show a construction of the address control system in a conventional cache system.
Figure 3B:
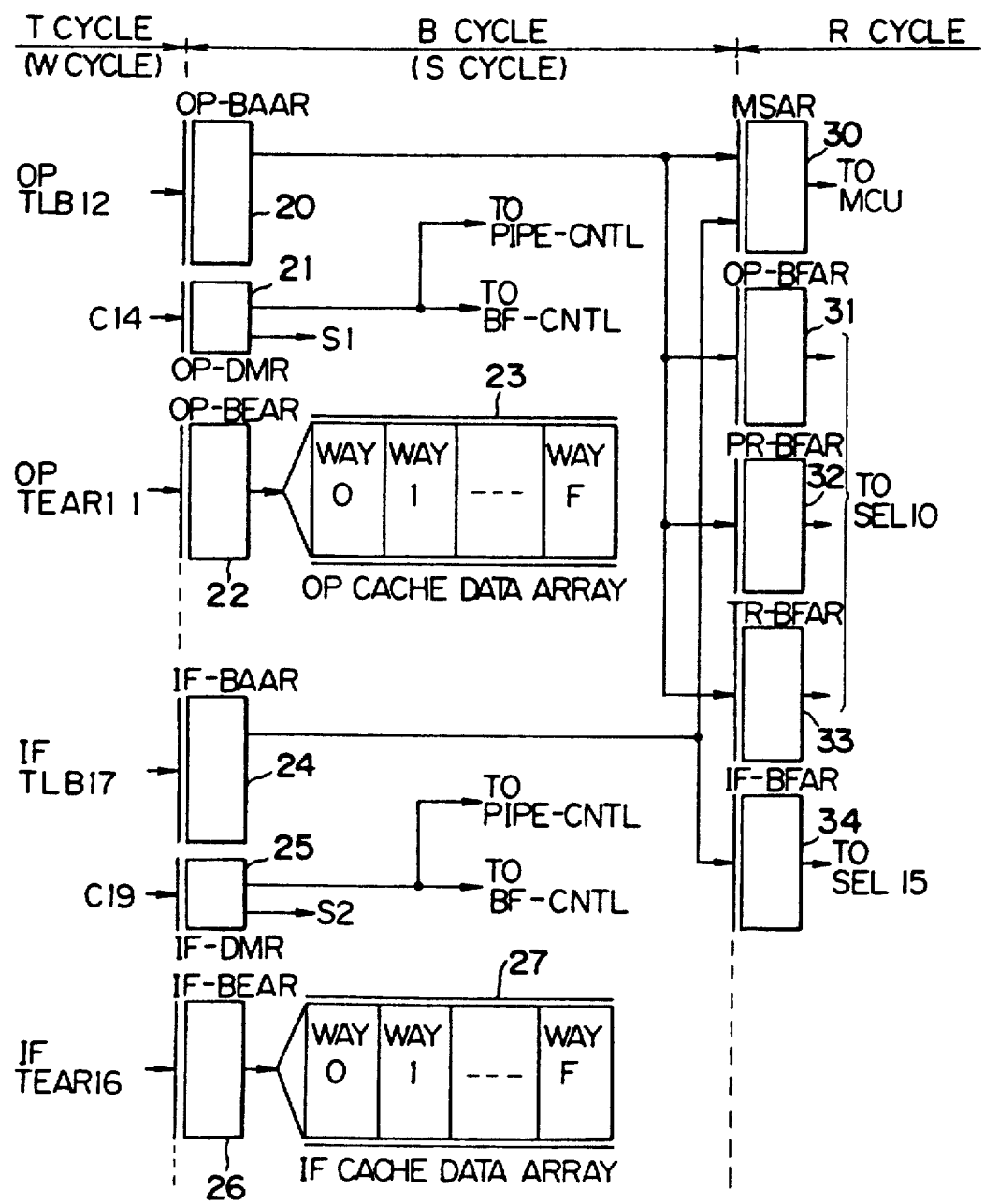

FIGS. 3A and 3B show a construction of the address control system in a conventional cache system. In FIGS. 3A and 3B, the construction consists of four sections: the P-cycle section, T-cycle or W-cycle section, B-cycle or S-cycle section, and R-cycle section. The P-cycle is a priority cycle; the T-cycle is an address translation cycle or a search cycle; the W-cycle is a writing cycle in a cache directory; the B-cycle is a reading cycle from a data array of a cache; the S-cycle is a writing cycle to a cache data array; and the R-cycle is a result cycle.

In the construction of FIGS. 3A and 3B, the P-cycle section comprises an operand address selector 10 and an instruction address selector 15. In the construction of FIGS. 3A and 3B, the T-cycle or W-cycle section comprises an operand T-cycle effective address register (OP-TEAR) 11, an instruction T-cycle effective address register (IF-TEAR) 16, an operand address translation buffer (OP-TLB) 12, an instruction address translation buffer (IF-TLB) 17, an operand cache directory 13, an instruction cache directory 18, and comparators 14 and 19. In the construction of FIGS. 3A and 3B, the B-cycle or S-cycle section comprises an operand B-cycle absolute address register (OP-BAAR) 20, an instruction B-cycle absolute address register (IF-BAAR) 24, an operand directory matching register (OP-DMR) 21, an instruction directory matching register (IF-DMR) 25, an operand B-cycle effective address register (OP-BEAR) 22, an instruction B-cycle effective address register (IF-BEAR) 26, an operand cache data array 23, and an instruction cache data array 27. In the construction of FIGS. 3A and 3B, the R-cycle section comprises a main storage address register (MSAR) 30, an operand fetch block address register (OP-BFAR) 31, a prefetch block address register (PR-BFAR) 32, a TLB block fetch address register (TR-BFAR) 33, and an instruction fetch block address register (IF-BFAR) 34. "PIPE-CNTL" and "BF-CNTL" denote logic circuits, and are a pipeline controller and a block fetch controller, respectively, each of which outputs control signals as mentioned before with reference to FIG. 2. The other control signals will be described later.

Figure 4:
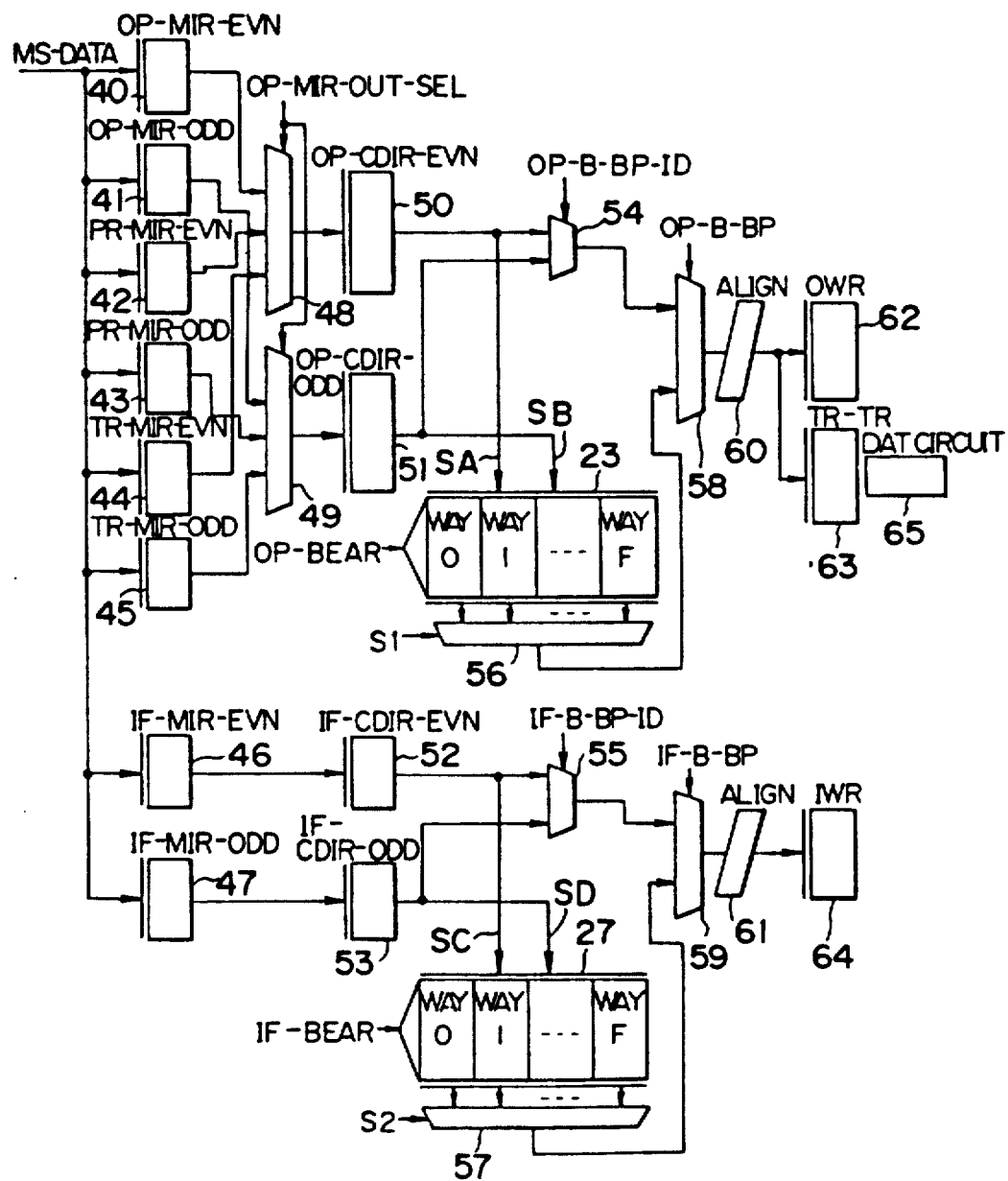
FIG. 4 shows a construction of the data moving-in and bypassing system in the conventional cache system.

FIG. 4 shows a construction of the data moving-in and bypassing system in the abovementioned conventional cache system.

The construction of FIG. 4 comprises an operand move-in register for even-numbered sets of data (OP-MIR-EVN) 40, an operand move-in register for odd-numbered sets of data (OP-MIR-ODD) 41, a prefetch move-in register for even-numbered sets of data (PR-MIR-EVN) 42, a prefetch move-in register for odd-numbered sets of data (PR-MIR-ODD) 43, an address translation buffer move-in register for even-numbered sets of data (TR-MIR-EVN) 44, an address translation buffer move-in register for odd-numbered sets of data (TR-MIR-ODD) 45, an instruction move-in register for even-numbered sets of data (IF-MIR-EVN) 46, an instruction move-in register for odd-numbered sets of data (IF-MIR-ODD) 47, an operand move-in register output selector for even-numbered sets of data 48, an operand move-in register output selector for odd-numbered sets of data 49, an operand cache data-in register for even-numbered sets of data (OP-CDIR-EVN) 50, an operand cache data-in register for odd-numbered sets of data (OP-CDIR-ODD) 51, an instruction cache data-in register for even-numbered sets of data (IF-CDIR-EVN) 52, an instruction cache data-in register for odd-numbered sets of data (IF-CDIR-ODD) 53, an operand bypass data selector 54, an instruction bypass data selector 55, the operand cache data array 23 and the instruction cache data array 27 as shown in FIG. 3A and 3B, an operand cache data array output selector 56, an instruction cache data array output selector 57, an operand bypass/cache selector 58, an instruction bypass/cache selector 59, an operand data align circuit 60, an instruction data align circuit 61, the operand word register (OWR) 62 and the instruction word register (IWR) 64, as shown in FIG. 1, an address translation buffer request data register 63, and a dynamic address translation (DAT) circuit 65.

The function and operation of the conventional cache system is explained below with reference to FIGS. 3A, 3B, and 4.

First, assume that the instruction unit (Iu) 1A outputs the operand fetch request (OP-REQ) together with the operand fetch request address signal (OP-REQ-ADRS) to the storage control unit (Su) 1B. The storage control unit (Su) 1B receives the operand fetch request address signal (OP-REQ-ADRS) at input terminals of the operand address selector 10 in the P-cycle. Although the outputs of the operand fetch block address register (OP-BFAR) 31, the prefetch block address register (PR-BFAR) 32, and the TLB block fetch address register (TR-BFAR) 33 are also applied to the input terminals of the operand address selector 10, at this time, the operand fetch request address signal (OP-REQ-ADRS) is output, under the control of the operand address select signal (OP-ADRS-SEL), and the output of the operand address selector 10 is applied to the operand T-cycle effective address register (OP-TEAR) 11.

In the T-cycle, the operand fetch request address signal (OP-REQ-ADRS) is latched in the operand T-cycle effective address register (OP-TEAR) 11 as an effective address, and is output to the operand address translation buffer (OP-TLB) 12. The operand address translation buffer (OP-TLB) 12 receives the abovementioned effective address, and transforms it to a corresponding absolute address. The absolute address is then applied to the operand B-cycle absolute address register (OP-BAAR) 20.

On the other hand, a part of the above effective address held in the operand T-cycle effective address register (OP-TEAR) 11 is applied to the operand cache directory 13 as a tag address. Each of the caches provided for the operand fetch system or the instruction fetch system, as shown in FIG. 3A and 3B, consists of a cache directory 13 or 18 and a cache data array 23 or 27, respectively, and each of the caches, i.e., each of the cache directories 13 and 18 and cache data arrays 23 and 27, comprises 16 ways, WAY 0, WAY 1, ... WAY F (in hexadecimal numbers). Notes each way corresponds to 64 bytes of data. The comparator 14 compares the output of the operand cache directory 13 corresponding to the tag address with the output of the operand address translation buffer (OP-TLB) 12, i.e., the abovementioned absolute address, which is used as a comparison tag address. The output of the comparator 14 is then applied to the operand directory matching register (OP-DMR) 21.

In addition, the output of the operand T-cycle effective address register (OP-TEAR) 11, i.e., the effective address is applied to the operand B-cycle effective address register (OP-BEAR) 22.

In the B-cycle, the output of the comparator 14 is latched in the operand directory matching register (OP-DMR) 21. If an output from a certain way of the operand cache directory and the comparison tag address are matched, i.e., a hit occurs, the output of the operand directory matching register (OP-DMR) 21 is sent to the logic circuit "PIPE-CNTL", and accordingly, the logic circuit "PIPE-CNTL" outputs the operand fetch status valid signal (OP-STV) to the instruction unit (Iu) 1A. At the same time, the effective address is held in the operand B-cycle effective address register (OP-BEAR) 22, and the output, i.e., the effective address is applied to the operand cache data array 23 as an address for reading out the data. Accordingly, the data of the address from the 16 ways in the operand cache data array 23 is read out and applied to the operand cache data array output selector 56 shown in FIG. 4. At this time, a signal S1, which indicates a matched way, is also output from the operand directory matching register (OP-DMR) 21, and is applied to the control signal input terminal of the operand cache data array output selector 56. Under the control of the signal S1, the data requested by the instruction unit (Iu) 1A is output from the operand cache data array output selector 56 and is applied to the instruction bypass/cache selector 58 as one of the input data.

In the case of a hit, in the R-cycle, the data requested by the instruction unit (Iu) 1A is output at the operand bypass/cache selector 58 under the control of the signal S1, the head of the selected data is then correctly positioned through the operand data align circuit 60, and the data is latched in the operand word register (OWR) 62 in the execution unit (Eu) 1C.

In the case of a miss-hit, i.e., the tag address and the comparison tag address are not matched, in the B-cycle, the output of the comparator 14, latched in the operand directory matching register (OP-DMR) 21 is sent to the logic circuit "PIPE-CNTL", and accordingly, the logic circuit "PIPE-CNTL" outputs the operand fetch line missing detect signal (OP-LMD) to the instruction unit (Iu) 1A.

At the same time, the output of the operand address translation buffer (OP-TLB) 12, i.e., the absolute address, is held in the operand B-cycle absolute address register (OP-BAAR) 20, and the output of the register 20 is applied to the main storage address register (MSAR) 30. This output, i.e., the absolute address, in the R-cycle, is held in the main storage address register (MSAR) 30, and the output of the register 30 is sent to the memory control unit (MCU) 2 as a main storage request address signal (MS-REQ-ADRS). The absolute address is also applied to the operand fetch block address register (OP-BFAR) 31 and is held in the operand fetch block address register (OP-BFAR) 31 during the corresponding block fetch operation. The output of the operand fetch block address register (OP-BFAR) 31 is applied to the corresponding input terminal of the operand address selector 10.

At this time, the output of the operand directory matching register (OP-DMR) 21 is sent to the logic circuit "BF-CNTL", and accordingly, the logic circuit "BF-CNTL" outputs the aforementioned main storage request signal (MS-REQ) and the request identifier (REQ-ID) to the memory control unit (MCU) 2, thus commencing the operation of fetching the block of data in which the requested operand data is included.

In the process for a prefetch or address translation buffer request, when a block fetch from the memory control unit (MCU) 2 is carried out, an address signal is held in the main storage address register (MSAR) 30 and then sent to the memory control unit (MCU) 2. The address is also held in the prefetch block address register (PR-BFAR) 32 or the TLB block fetch address register (TR-BFAR) 33 during the block fetch operation. The outputs of the prefetch block address register (PR-BFAR) 32 and the TLB block fetch address register (TR-BFAR) 33 are applied to the corresponding input terminals of the operand address selector 10.

The block fetch mentioned above is carried out for 64 bytes, and in practice, 8 bytes of the data from the main storage (MS) 3 is sent 8 times, i.e., 8-bytes of data per cycle are sent over 8 cycles. The data identifier (DATA-ID) of the prior art indicates the identifying number of each sets of 8-bytes of data in a block, i.e., 0, 1, ... 7. The data-out warning signal (DOW), the return identifier (RTN-ID), and the data identifier (DATA-ID) are output from the main storage (MS) 3, 3 cycles ($3\tau$) prior to the data (MS-DATA). The data-out warning signal (DOW), the return identifier (RTN-ID), and the data identifier (DATA-ID) are transformed to control signals in the logic circuit "BF-CNTL", and these control signals are used for controlling the moving-in and bypassing operations of the data (MS-DATA), and therefore, the output of the data must be made 3 cycles ($3\tau$) earlier for adjusting the timings of the control signals in some stages of those operations of the data (MS-DATA).

Three cycles ($3\tau$) after the time that the first data-out warning signal (DOW) is output, the logic circuit "BF-CNTL" outputs an operand bypass request (OP-BP-REQ) to the logic circuit "PIPE-CNTL". In accordance with this signal, the logic circuit "PIPE-CNTL" outputs the operand line missing release signal (OP-LMR) for the data fetch request for which the operand fetch line missing detect signal (OP-LMD) was output, to the instruction unit (Iu) 1A, and accordingly, the instruction unit (Iu) 1A again sends the operand fetch request (OP-REQ) once again to the storage control unit (Su) 1B. At this time, the logic circuit "PIPE-CNTL" also outputs the operand address select signal (OP-ADRS-SEL) to the operand address selector 10 shown in FIG. 3A and 3B, to select the output of the operand fetch block address register (OP-BFAR) 31 from among the address signals applied to the input terminals of the operand address selector 10.

The selected address is held in the operand T-cycle effective address register (OP-TEAR) 11 in the W-cycle. In the W-cycle, the content of a way in the operand cache directory 13 in FIG. 3A is rewritten by a part of the address held in the operand T-cycle effective address register (OP-TEAR) 11, and a constant number of less significant bits of the address is applied to the operand B-cycle effective address register (OP-BEAR) 22 shown in FIG. 3B.

In the S-cycle, the address is held in the operand B-cycle effective address register (OP-BEAR) 22, and the output of the register 22 is then applied to the operand cache data array 23 shown in FIG. 3B as an address in which a block of data is to be written.

As readily understood from the similarity between the constructions of the address control systems for the operand fetch and instruction fetch shown in FIG. 3A and 3B, the function and operation of the address control systems for the instruction fetch is similar to that of operand fetch mentioned above.

Referring to FIG. 4, for the operand fetch, sets of 8-bytes of data sent from the main storage (MS) 3 in each cycle for a block fetch are held alternatively in the operand move-in register for even-numbered sets of data (OP-MIR-EVN) 40 and in the operand move-in register for odd-numbered sets of data (OP-MIR-ODD) 41, i.e., each set of 8-bytes of data having (DATA-ID)=0, 2, 4, 6, is held in the operand move-in register for even-numbered set of data (OP-MIR-EVN) 40, and each sets of 8-bytes of data having (DATA-ID)=1, 3, 5, 7, is held in the operand move-in register for odd-numbered sets of data (OP-MIR-ODD) 41, under the control of control signals output from the logic circuit "PIPE-CNTL" corresponding to the request identifier (REQ-ID) and the data identifier (DATA-ID).

In the construction of FIG. 4, the data read-in port comprises a pair of move-in registers consisting of one register for even-numbered sets of data and another register for odd-numbered sets of data provided exclusively for each type of data fetch; i.e., operand fetch, prefetch, data fetch for address translation buffer rewriting, and instruction fetch.

The outputs of the operand move-in register for even-numbered sets of data (OP-MIR-EVN) 40, the prefetch move-in register for even-numbered sets of data (PR-MIR-EVN) 42, and the address translation buffer move-in register for even-numbered sets of data (TR-MIR-EVN) 44, are applied to the operand move-in register output selector for even-numbered sets of data 48. Likewise, the outputs of the operand move-in register for odd-numbered sets of data (OP-MIR-ODD) 41, the prefetch move-in register for odd-numbered sets of data (PR-MIR-ODD) 43, and the address translation buffer move-in register for odd-numbered sets of data (TR-MIR-ODD) 45, are applied to the operand move-in register output selector for odd-numbered sets of data 49. In each selector 48 and 49, the output is selected under the control of the operand move-in register output select signal (OP-MIR-OUT-SEL) output from the logic circuit "BF-CNTL" according to the return identifier (RTN-ID). The output of the operand move-in register output selector for even-numbered sets of data 48 is applied to the operand cache data-in register for even-numbered sets of data (OP-CDIR-EVN) 50, and the output of the operand move-in register output selector for odd-numbered sets of data 49 is applied to the operand cache data-in register for odd-numbered sets of data (OP-CDIR-ODD) 51.

Similarly, in the construction of FIG. 4, the output of the instruction move-in register for even-numbered sets of data (IF-MIR-EVN) 46 is applied to the instruction cache data in register for even-numbered sets of data (IF-CDIR-EVN) 52, and the output of the instruction move-in register for odd-numbered sets of data (IF-MIR-ODD) 47 is applied to the instruction cache data-in register for odd-numbered sets of data (IF-CDIR-ODD) 53.

Every time both of the operand move-in register for even-numbered sets of data (OP-MIR-EVN) 40 and the operand move-in register for odd-numbered sets of data (OP-MIR-ODD) 41 are filled with a new 8-bytes of data, the 16 bytes of data as a total are applied to the input terminal of the operand cache data array 23, (see 5A and 5B) and then, under the control of an output of the logic circuit "BF-CNTL" the 16 bytes of the data are written in the operand cache data array 23. By repeating this operation 4 times, a block of data, i.e., 64 bytes of data, is moved into the operand cache data array 23.

Similarly, every time both of the instruction move-in register for even-numbered sets of data (IF-MIR-EVN) 46 and the instruction move-in register for odd-numbered sets of data (IF-MIR-ODD) 47 are filled with a new 8-bytes of data, the 16 bytes of data as a total are applied to the input terminal of the instruction cache data array 27, (see 5C and 5D), and then, under the control of another output of the logic circuit "BF-CNTL" the 16 bytes of the data are written in the instruction cache data array 27. By repeating this operation 4 times, a block of data, i.e., 64 bytes of data, is moved into the instruction cache data array 27.

On the other hand, under the control of control signals output by the logic circuit "BF-CNTL" and the logic circuit "PIPE-CNTL", the data requested by the instruction unit (Iu) 1A can be directly sent, i.e., by bypassing the cache, from the operand cache data-in register for even-numbered sets of data (OP-CDIR-EVN) 50 to the operand word register (OWR) 62 or the address translation buffer request data register 63, or from the operand cache data-in register for odd-numbered sets of data (OP-CDIR-ODD) 51 to the operand word register (OWR) 62 or the address translation buffer request data register 63. Also under the control by control signals output by the logic circuit "BF-CNTL" and the aforementioned logic circuit "PIPE-CNTL", the data requested by the instruction unit (Iu) 1A can be directly sent, i.e., by bypassing the cache, from the instruction cache data-in register for even-numbered sets of data (IF-CDIR-EVN) 52 or the instruction cache data-in register for odd-numbered sets of data (IF-CDIR-ODD) 53, to the instruction word register (IWR) 64.

In detail, the bypassing operation is executed as follows:

The data held in the operand cache data-in register for even-numbered sets of data (OP-CDIR-EVN) 50 and the data held in the operand cache data-in register for odd-numbered sets of data (OP-CDIR-ODD) 51 are applied to the operand bypass data selector 54.

At the operand bypass data selector 54, under the control of the operand B-cycle bypass identifying signal (OP-B-BP-ID), where the signal (OP-B-BP-ID) is output from the logic circuit "BF-CNTL", 8 bytes of data which include the data requested by the instruction unit (Iu) 1A are selected. Similarly, also at the instruction bypass data selector 55, and under the control of an instruction B-cycle bypass identifying signal (IF-B-BP-ID), where the signal (IF-B-BP-ID) is output from the logic circuit "BF-CNTL", 8 bytes of data which include the data requested by the instruction unit (Iu) 1A are selected.

Under the control of an operand B-cycle bypass signal (OP-B-BP), the operand bypass/cache selector 58 in FIG. 4 selects the output of the operand cache data array output selector 56 in the case of a hit, or selects the output of the operand bypass data selector 54 in the case of a miss-hit. Similarly, under the control of an instruction B-cycle bypass signal (IF-B-BP), the instruction bypass/cache selector 59 selects the output of the instruction cache data array output selector 57 in the case of hit, or selects the output of the instruction bypass data selector 55 in the case of a miss-hit.

Figure 5B:
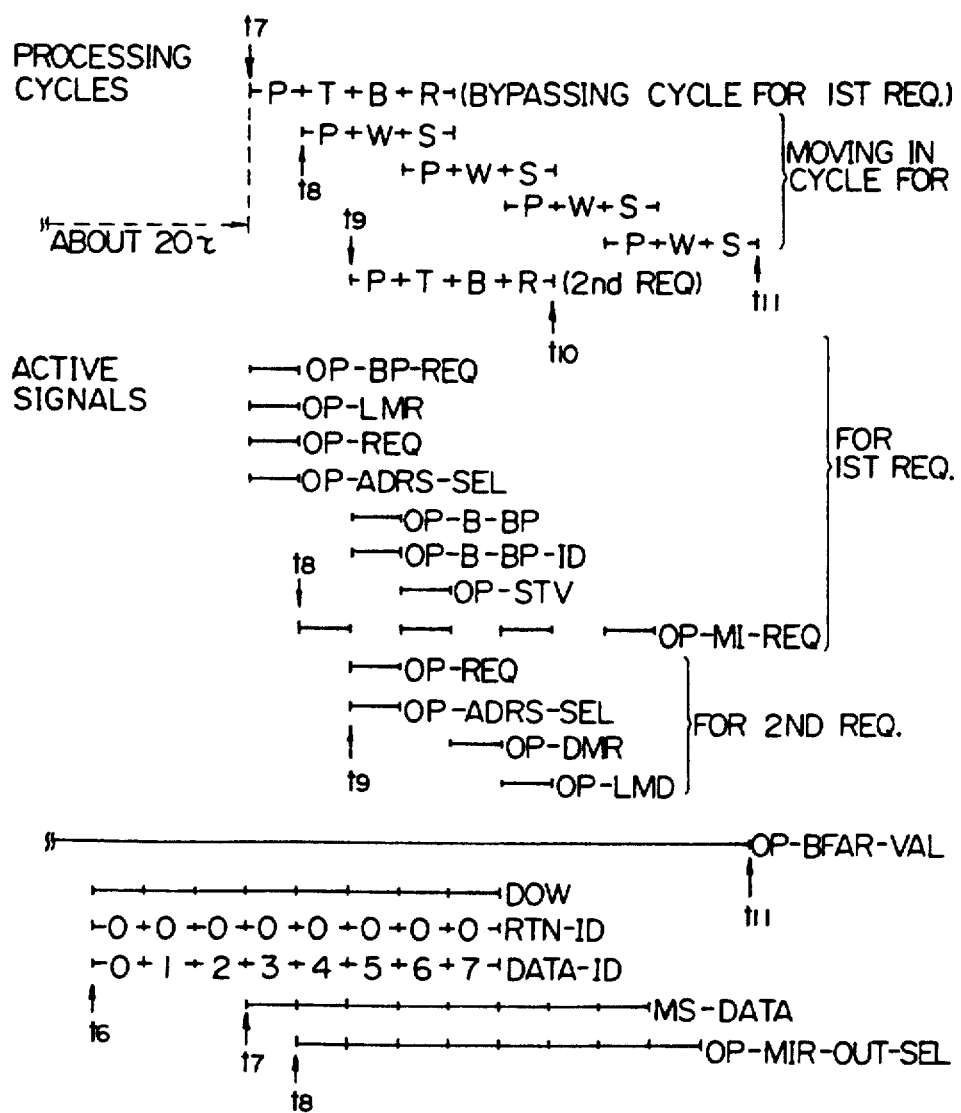
Figure 5C:
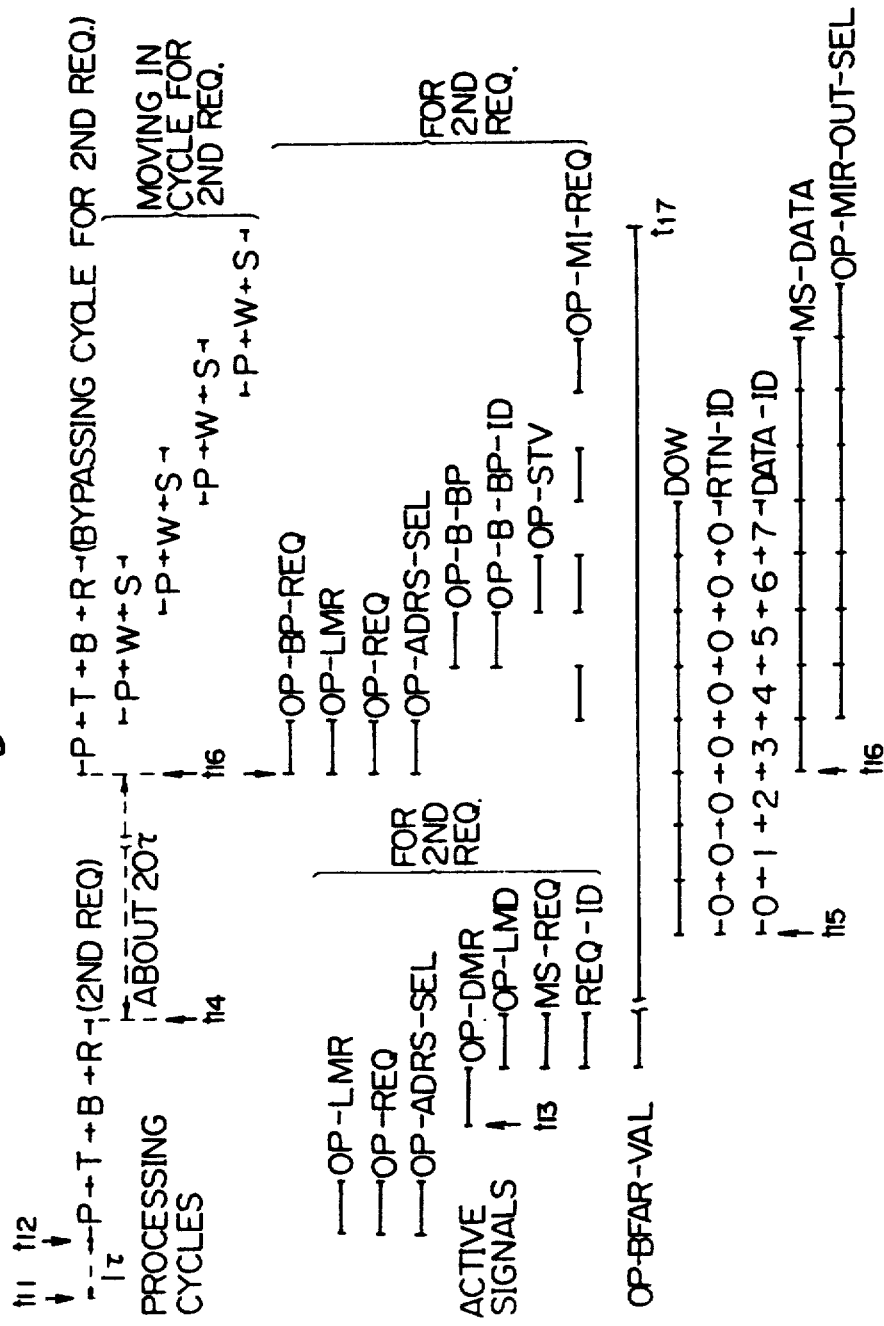

FIGS. 5A, 5B, and 5C show a timing relationship of the processing cycles and the main signals in the conventional cache system shown in FIGS. 3A, 3B, and 4.

In the central processing unit (CPU) 1 of this embodiment, a pipeline processing is executed, and therefore, an instruction fetch request is usually output from the instruction unit (Iu) 1A at each cycle. As shown in FIG. 5A, at the time $t_1$, the first operand fetch request (OP-REQ) is output, and then at the time $t_2$, the second operand fetch request (OP-REQ) of the same type, i.e., an operand fetch request, is output, and at the time $t_3$, the third operand fetch request (OP-REQ) is output.

As readily understood from the construction shown in FIGS. 3A and 3B, because the processing for the same type of the data fetch request, can not be executed at the same time, in each section of the construction in FIGS. 3A and 3B, the processing cycle for the second operand fetch request (OP-REQ) stops at the B-cycle at the time $t_5$, and the processing cycle for the third operand fetch request (OP-REQ) stops at the T-cycle at the time $t_5$.

Regarding the processing cycle for the first operand fetch request (OP-REQ), at the time $t_1$ corresponding to the first operand fetch request (OP-REQ), the operand address select signal (OP-ADRS-SEL) for selecting the corresponding operand fetch request address signal (OP-REQ-ADRS) at the operand address selector 10 in FIG. 3A, is output. After a search of the operand cache directory 13, at the time $t_3$, the result of the search is held in the operand directory matching register (OP-DMR) 21.

In FIG. 5A, shows the case when a mishit occurs, wherein, in the following R-cycle, the operand fetch line missing detect signal (OP-LMD) is sent at the time $t_4$ to the instruction unit (Iu) 1A, and the main storage request signal (MS-REQ) and the request identifier (REQ-ID) are sent to the memory control unit (MCU) 2. At the same time, to indicate that a block fetch is in operation, a operand block fetch address register valid signal (OP-BFAR-VAL) becomes active. Corresponding to the above main storage request (MS-REQ), at the time $t_7$, i.e., about 20 cycles (20τ) after the request (MS-REQ) and the request identifier (REQ-ID) are output, the transfer of the corresponding block of data MS-DATA from the memory control unit (MCU) 2 begins.

As mentioned before, the data-out warning signal (DOW), the return identifier (RTN-ID), and the data identifier (DATA-ID) are output from the memory control unit (MCU) 2, 3 cycles (3τ) before the output of the data (MS-DATA), at the time $t_6$. In FIG. 5B, the return identifier (RTN-ID) is "0", which denotes an operand fetch. Further as mentioned above, three cycles (3τ) after the time that the first data-out warning signal (DOW) is output, i.e., at the timing of the beginning of the transfer of the data (MS-DATA), the operand bypass request (OP-BP-REQ), and the corresponding operand line missing release signal (OP-LMR) are output to the instruction unit (Iu) 1A, and accordingly, the instruction unit (Iu) 1A again sends the operand fetch request (OP-REQ) to the storage control unit (Su) 1B. Accordingly, the operand address select signal (OP-ADRS-SEL) is output to the operand address selector 10 in FIG. 3A, to select the output of the operand fetch block address register (OP-BFAR) 31 as an address to be applied to the operand T-cycle effective address register (OP-TEAR) 11 in FIG. 3A.

At the time $t_7$, the operation of bypassing the transferred data also begins. For the bypassing operation, at the time $t_9$, the operand B-cycle bypass signal (OP-B-BP) and the operand B-cycle bypass identifying signal (OP-B-BP-ID) are also output, to control the selectors 54 and 58 in FIG. 4.

At the time $t_8$, an operand move-in request (OP-MI-REQ) to start the moving-in process for the transferred data, and the operand move-in output select signal (OP-MIR-OUT-SEL) to control the selection in the operand move-in register output selector for even-numbered sets of data 48 and the operand move-in register output selector for odd-numbered sets of data 49 in FIG. 4, are output from the logic circuit "BF-CNTL". The moving-in cycle of the transferred data, which consists of 4 P-, W-, and S-cycles, is executed during the time interval from $t_8$ to $t_{11}$.

Regarding the operation of the second operand fetch request, during the time interval of from $t_9$ to $t_{10}$, the P-, T-, B-, and R-cycles can be executed without interrupting the operation for the first operand fetch request. Nevertheless, because the operand block fetch address register valid signal (OP-BFAR-VAL) is active until the moving-in operation for the first operand fetch request is completed, in the R-cycle, the logic circuit "PIPE-CNTL" again outputs the operand fetch line missing detect signal (OP-LMD), and the operation for the second operand fetch request is stopped at the time $t_{10}$.

One cycle (1τ) after the operand block fetch address register valid signal (OP-BFAR-VAL) becomes nonactive, at the time $t_{12}$, the operation of the second operand fetch request, which consists of the P-, T-, B-, and R-cycles, is begun, i.e., the operand line missing release signal (OP-LMR) is sent to the instruction unit (Iu) 1A, and accordingly, the operand fetch request (OP-REQ) and the operand address select signal (OP-ADRS-SEL) are sent from the instruction unit (Iu) 1A. At this time, the same process as executed during the time interval of from $t_1$ to $t_5$ for the first operand fetch request is executed for the second operand fetch request during the time interval of from $t_{12}$ to $t_{14}$.

About 20 cycles (20τ) after the time of the end of the R-cycle at the time $t_{14}$, i.e., at the time $t_{16}$, the corresponding block of data, MS-DATA, is transferred from the memory control unit (MCU) 2.

The same process as executed during the time interval of from $t_6$ to $t_{11}$ for the first operand fetch request is executed for the second operand fetch request during the time interval of from $t_{15}$ to $t_{17}$.

As stated above and shown in FIGS. 5A, 5B, and 5C, in the cache system of the prior art, during the block fetch operation for the first operand fetch request, the block fetch operation for the second operand fetch request of the same type as the first operand fetch request can not be started. That means that the cache system of the prior art, does not operate efficiently, when a block fetch of the same type as the previous block fetch is requested.

FIGS. 6A, 6B, 7, 8, 9, 10, 11, 12, and 13 show a construction of the embodiment of the present invention.

The embodiment of the present invention as explained below, is also within the scope of the construction of FIG. 1, and the sequences of the main signals between the components in FIG. 1, shown in FIG. 2, are also applicable to the embodiment of the present invention except that, in this embodiment, the return identifier (RTN-ID) indicates which port is to be used for the pertaining block fetch, as explained later.

Figure 6A:
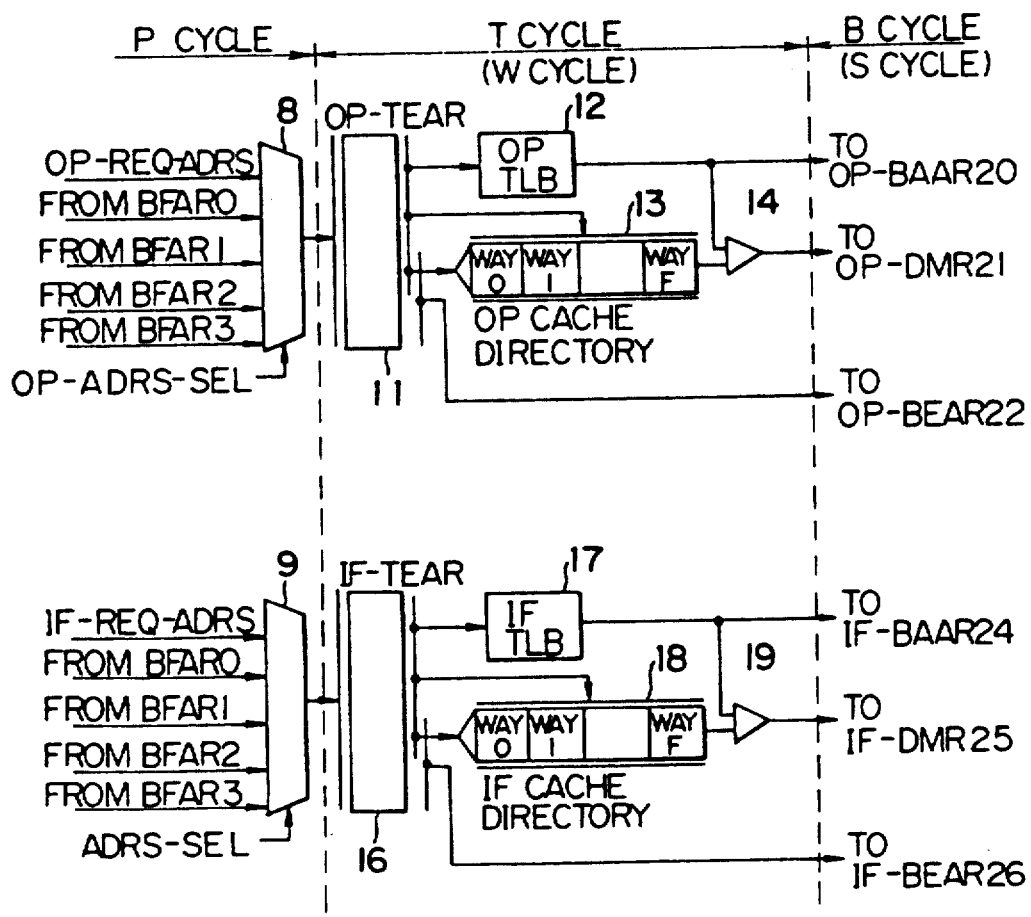
FIGS. 6A and 6B show a construction of the address control system in a cache system in the embodiment of the present invention.
Figure 6B:
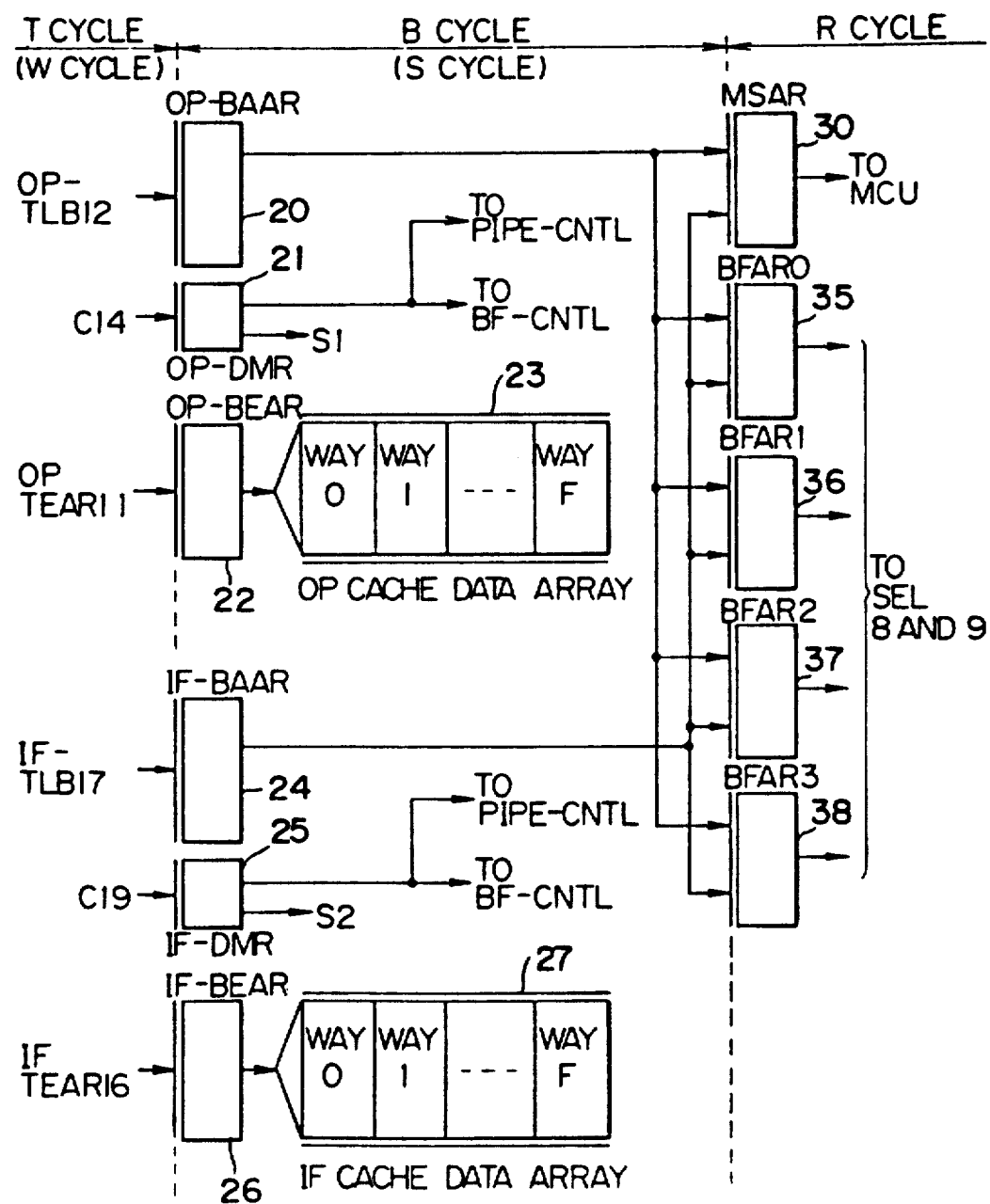

FIGS. 6A and 6B show a construction of an address control system in the cache system according to the present invention. The construction shown in FIGS. 6A and 6B, according to the present invention, corresponds to the construction shown in FIGS. 3A and 3B of the prior art.

Figure 7:
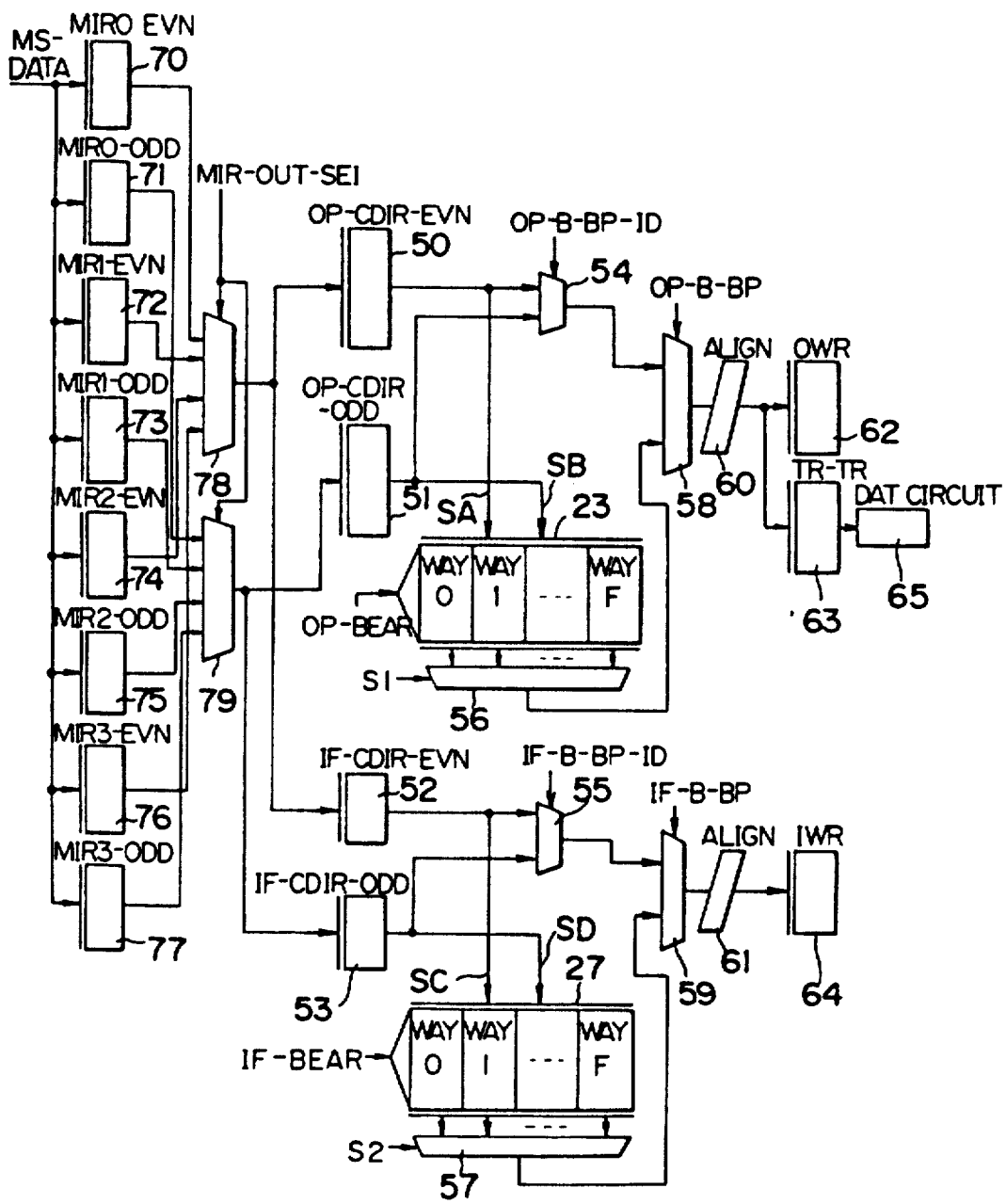
FIG. 7 shows a construction of the data moving-in and bypassing system in the cache system in the embodiment of the present invention.

FIG. 7 shows a construction of a data moving-in and bypassing system according to the present invention. The construction shown in FIG. 7, according to the present invention, corresponds to the construction shown in FIG. 4 of the prior art.

Similar to the construction shown in FIGS. 3A and 3B of the prior art, the construction shown in FIGS. 6A and 6B consists of four sections: a P-cycle section, T-cycle or W-cycle section, B-cycle or S-cycle section, and R-cycle section. The operation, etc., of each cycle is the same as in the prior art.

In the construction of FIGS. 6A and 6B, the constructions of the T-cycle or W-cycle section and the B-cycle or S-cycle section are basically the same as those in FIGS. 3A and 3B, and the difference between the construction shown in FIGS. 6A and 6B according to the present invention and the construction shown in FIGS. 3A and 3B of the prior art, lies in the P-cycle section and the R-cycle section.

In the R-cycle section in the construction of FIGS. 6A and 6B, four block fetch address registers 35, 36, 37, 38 are provided instead of the operand fetch block address register (OP-BFAR) 31, the prefetch block address register (PR-BFAR) 32, the TLB block fetch address register (TR-BFAR) 33, and the instruction fetch block address register (IF-BFAR) 34 of the prior art. Each of the four block fetch address registers 35, 36, 37, 38 can be used in a block fetch for any type of data fetch request when the block fetch address register is not used for a block fetch for the previous data fetch request.

In the P-cycle section in the construction of FIGS. 6A and 6B, an operand address selector 8 and an instruction address selector 9 are provided. Each of the address selectors 8 and 9 receive all of the outputs of the block fetch address registers 35, 36, 37, 38, in addition to the corresponding request address signal, i.e., the operand fetch request address signal (OP-REQ-ADRS) or the instruction fetch request address signal (IF-REQ-ADRS), respectively.

Referring to FIG. 7, the difference between the construction shown in FIG. 7 according to the present invention and the construction shown in FIG. 4 of the prior art, lies in the plurality of move-in registers. In the construction of FIG. 7, a first pair of move-in registers for even-numbered sets of data (MIR0-EVN) 70 and for odd-numbered sets of data (MIR0-ODD) 71, a second pair of move-in registers for even-numbered sets of data (MIR1-EVN) 72 and for odd-numbered sets of data (MIR1-ODD) 73, a third pair of move-in registers for even-numbered sets of data (MIR2-EVN) 74 and for odd-numbered sets of data (MIR2-ODD) 75, and a fourth pair of move-in registers for even-numbered sets of data (MIR3-EVN) 76 and for odd-numbered sets of data (MIR3-ODD) 77 are provided, instead of the operand move-in register for even-numbered sets of data (OP-MIR-EVN) 40, the operand move-in register for odd-numbered sets of data (OP-MIR-ODD) 41, the prefetch move-in register for even-numbered sets of data (PR-MIR-EVN) 42, the prefetch move-in register for odd-numbered sets of data (PR-MIR-ODD) 43, the address translation buffer move-in register for even-numbered sets of data (TR-MIR-EVN) 44, the address translation buffer move-in register for odd-numbered sets of data (TR-MIR-ODD) 45, the instruction move-in register for even-numbered sets of data (IF-MIR-EVN) 46, and the instruction move-in register for odd-numbered sets of data (IF-MIR-ODD) 47 shown in FIG. 4 of the prior art.

The 16 bytes of data transferred from the main storage (MS) 3, can be input to any pair of the move-in registers for even-numbered sets of data and for odd-numbered sets of data in FIG. 7 mentioned above, when that pair of move-in registers are not in use for a block fetch for the previous data fetch request.

In the construction of FIG. 7, the outputs of all of the move-in registers for even-numbered sets of data 70, 72, 74, 76, are applied to a move-in register output selector for even-numbered sets of data 78, and the outputs of all of the move-in registers for odd-numbered sets of data 71, 73, 75, 77, are applied to a move-in register output selector for odd-numbered sets of data 79. The selection in each of the selectors 78, 79 is controlled by a move-in register output select signal (MIR-OUT-SEL), output from a block fetch controller "BF-CNTL" 100, which corresponds to the logic circuit "BF-CNTL" in the prior art, as explained later.

The output of the move-in register output selector for even-numbered sets of data 78 is applied to the operand cache data-in register for even-numbered sets of data (OP-CDIR-EVN) 50 and the instruction cache data-in register for even-numbered sets of data (IF-CDIR-EVN) 52. The output of the move-in register output selector for odd-numbered sets of data 79 is applied to the operand cache data-in register for odd-numbered set of data (OP-CDIR-ODD) 51 and the instruction cache data-in register for odd-numbered sets of data (IF-CDIR-ODD) 53. The data applied to each of the above cache data-in registers 50, 51, 52, 53 is held in each of the cache data-in registers 50, 51, 52, 53 when a corresponding control signal applied to the control input terminal of each of the cache data-in registers 50, 51, 52, 53 is active.

The remaining part of the construction of FIG. 7 is basically the same as the corresponding part of the construction of FIG. 4.

Figure 8:
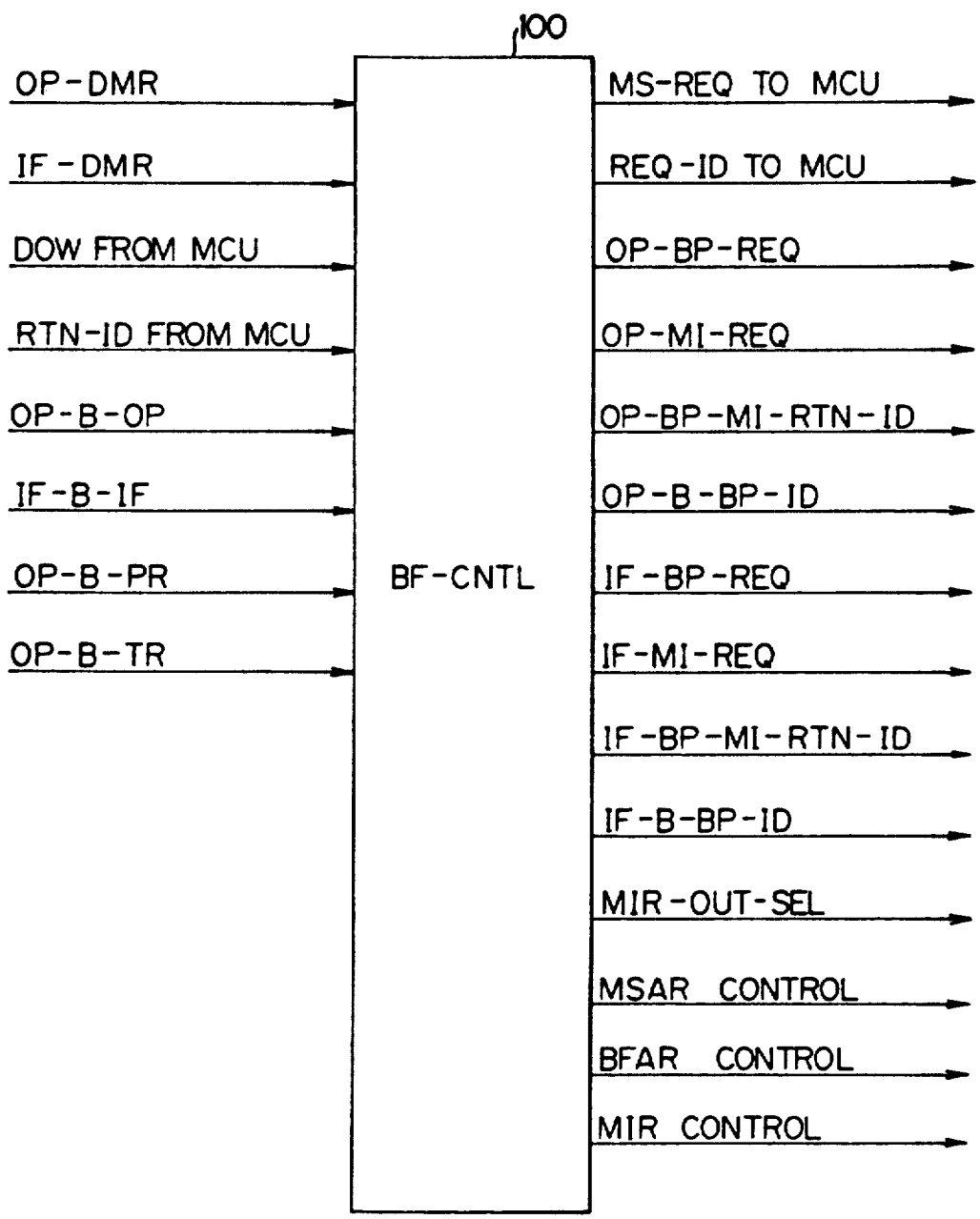
FIG. 8 shows input signals and output signals of the block fetch controller in the cache system in the embodiment of the present invention.

FIG. 8 shows the input signals and output signals of the block fetch controller "BF-CNTL" 100 in the cache system according to the present invention.

In FIG. 8, the block fetch controller "BF-CNTL" 100 inputs the output of the operand directory matching register (OP-DMR) 21, "OP-DMR", the output of the instruction directory matching register (IF-DMR) 25, "IF-DMR", the data-out warning signal "DOW", the return identifier "RTN-ID", an operand B-cycle operand signal "OP-B-OP", an instruction B-cycle instruction signal "IF-B-IF", an operand B-cycle prefetch signal "OP-B-PR", and an operand B-cycle translation signal "OP-B-TR".

Among the above signals, the operand B-cycle operand signal "OP-B-OP", the instruction B-cycle instruction signal "IF-B-IF", the operand B-cycle prefetch signal "OP-B-PR", and the operand B-cycle translation signal "OP-B-TR" are output from an operand pipeline controller "OP-PIPE-CNTL" 200 and the instruction pipeline controller "IF-PIPE-CNTL" 300, which correspond to the logic circuit "PIPE-CNTL" in the prior art and are explained later. These signals are active in the B-cycle operation for the pertaining type of data fetch request, e.g., the signal "OP-B-OP" is active in B-cycle operation for the operand fetch request.

The block fetch controller "BF-CNTL" 100 outputs the main storage request signal "MS-REQ", the request identifier "REQ-ID", the operand bypass request signal "OP-BP-REQ", the operand move-in request signal "OP-MI-REQ", an operand bypass move-in return identifying signal "OP-BP-MI-RTN-ID", the operand B-cycle bypass identifying signal "OP-B-BP-ID"; an instruction bypass request signal "IF-BP-REQ", an instruction move-in request signal "IF-MI-REQ", an instruction bypass move-in return identifying signal "IF-BP-MI-RTN-ID", the instruction B-cycle bypass identifying signal "IF-B-BP-ID", the move-in register output select signal "MIR-OUT-SEL", a control signal for the main storage address register (MSAR) 30, "MSAR CONTROL", control signals for the block fetch address registers (BFAR0~3) 35, 36, 37, 38, "BFAR CONTROL", and control signals for the move-in registers 70 to 77, "MIR CONTROL."

Among the above signals, the operand bypass move-in return identifying signal "OP-BP-MI-RTN-ID" is applied to the operand pipeline controller "OP-PIPE-CNTL" 200, so that the pipeline controller "OP-PIPE-CNTL" 200 outputs the operand address select signal (OP-ADRS-SEL) in the P-cycle for the bypassing and moving-in operations. The instruction bypass move-in return identifying signal "IF-BP-MI-RTN-ID" is applied to the instruction pipeline controller "IF-PIPE-CNTL" 300 so that the pipeline controller "IF-PIPE-CNTL" 300 outputs the instruction address select signal (IF-ADRS-SEL) in the P-cycle for the bypassing and moving-in operations.

Further, among the above signals, the instruction bypass request signal "IF-BP-REQ" is similar to the operand bypass request signal "OP-BP-REQ", each of "IF-BP-REQ" and "OP-BP-REQ" is output 3 cycles ($3\tau$) after the first data-out warning signal "DOW" for the corresponding data fetch request is output, respectively, to begin the bypassing operation. The instruction move-in request signal "IF-MI-REQ" is similar to the aforementioned operand moving-in request signal "OP-MI-REQ", each of "IF-MI-REQ" and "OP-MI-REQ" is output 1 cycle ($1\tau$) after the corresponding one of the above bypass request signals "IF-BP-REQ" or "OP-BP-REQ" is output, respectively, to begin the moving-in operation.

Figure 9:
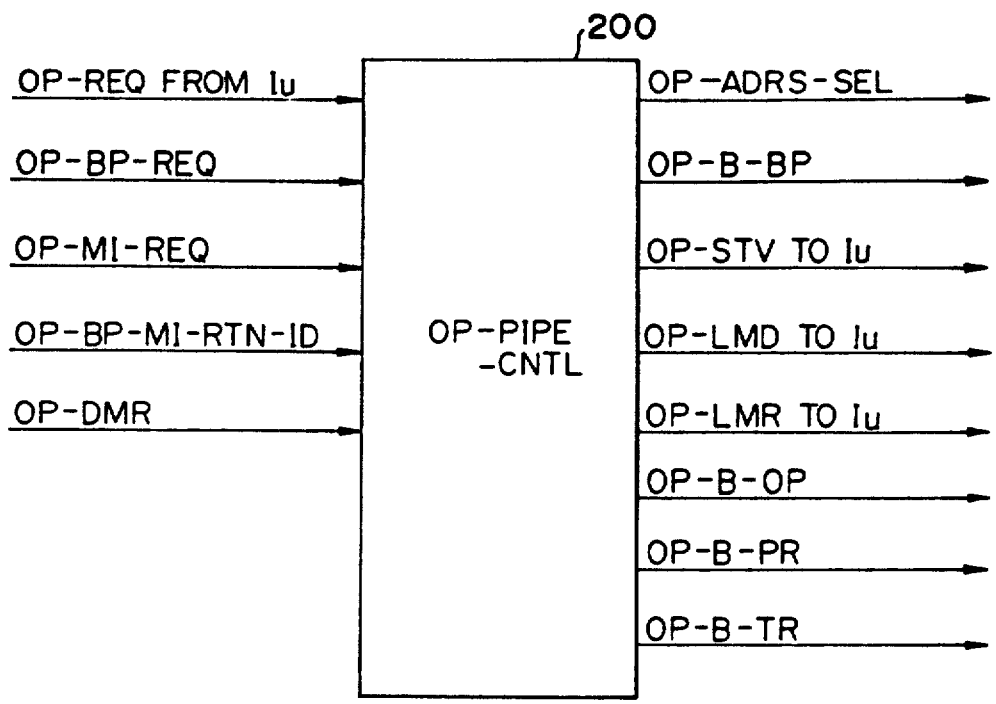
FIG. 9 shows input signals and output signals of the operand pipeline controller in the cache system in the embodiment of the present invention.

FIG. 9 shows input signals and output signals of the operand pipeline controller "OP-PIPE-CNTL" 200 in the cache system according to the present invention. In FIG. 9, the operand pipeline controller "OP-PIPE-CNTL" 200 inputs the operand fetch request "OP-REQ", the operand bypass request signal "OP-BP-REQ", the operand move-in request signal "OP-MI-REQ", the operand bypass move-in return identifying signal "OP-BP-MI-RTN-ID", and the output of the operand directory matching register (OP-DMR) 21, "OP-DMR". In FIG. 9, the operand pipeline controller "OP-PIPE-CNTL" 200 outputs the operand fetch address select signal "OP-ADRS-SEL", the operand fetch status valid signal "OP-STV", the operand fetch line missing detect signal "OP-LMD", the operand line missing release signal "OP-LMR", the operand B-cycle bypass signal "OP-B-OP", the operand B-cycle prefetch signal "OP-B-PR", and the operand B-cycle translation signal "OP-B-TR".

Figure 10:
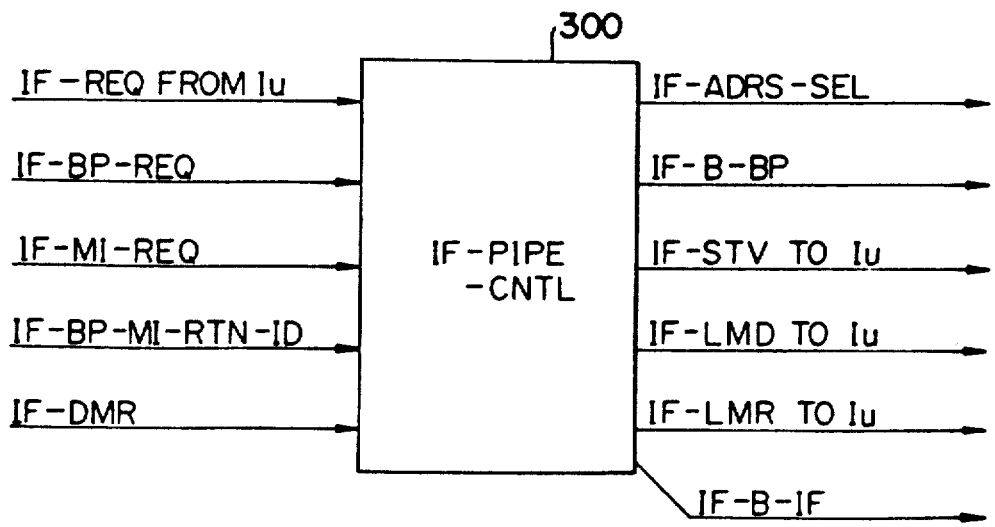
FIG. 10 shows input signals and output signals of the instruction pipeline controller in the cache system in the embodiment of the present invention.

FIG. 10 shows the input signals and output signals of the instruction operand pipeline controller "IF-PIPE-CNTL" 300 in the cache system according to the present invention. In FIG. 10, the instruction operand pipeline controller "IF-PIPE-CNTL" 300 inputs the instruction fetch request "IF-REQ", the instruction bypass request signal "IF-BP-REQ", the instruction move-in request signal "IF-MI-REQ", the instruction bypass move-in return identifying signal "IF-BP-MI-RTN-ID", and the output of the instruction directory matching register (IF-DMR) 25, "IF-DMR".

Also in FIG. 10, the instruction pipeline controller "IF-PIPE-CNTL" 300 outputs the instruction fetch address select signal "IF-ADRS-SEL", the instruction fetch status valid signal "IF-STV", the instruction fetch line missing detect signal "IF-LMD", the instruction line missing release signal "IF-LMR", and the instruction B-cycle instruction signal "IF-B-IF".

The relationship between the input signals and the output signals determines the logical functions of each of the block fetch controller "BF-CNTL" 100, the operand pipeline controller "OP-PIPE-CNTL" 200, and the instruction pipeline controller "IF-PIPE-CNTL" 300, and therefore, these controllers can be realized with hardware logic circuitry.

As stated before, in the present invention, each of the data fetch requests can be output from the available port of the plurality of the read-in ports, even during a data fetch operation for a previous data fetch request of the same type. In the following part of the specification, the execution of the read-in operation as stated above, in this embodiment, is explained.

Figure 11:
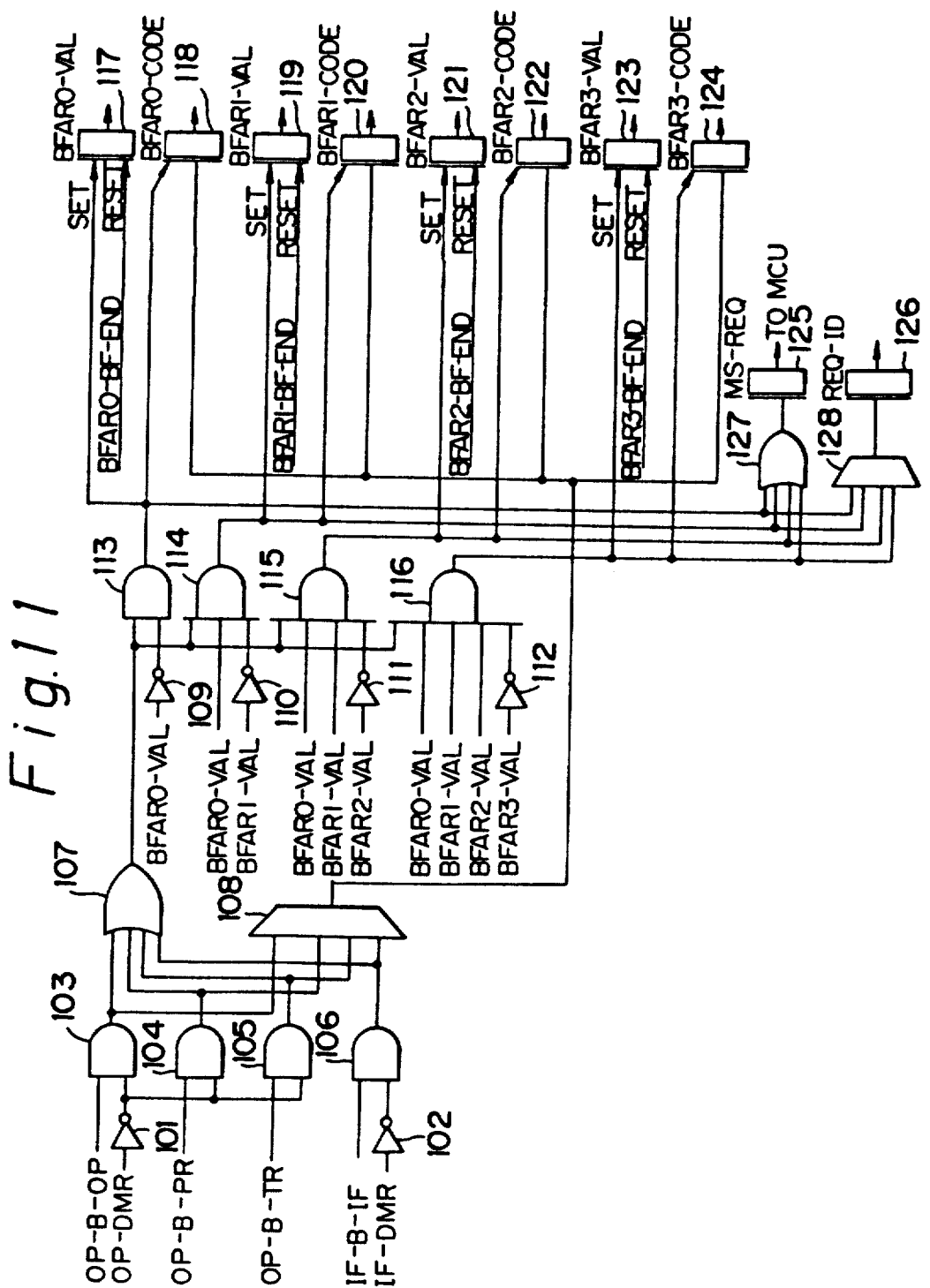
FIGS. 11 and 12 show an example of a part of a construction of a block fetch controller in the cache system in the embodiment of the present invention.

FIG. 11 shows the construction of a part of the block fetch controller "BF-CNTL" 100 for realizing the availability of each read-in port, and for holding the type of data fetch for which the corresponding read-in port is used.

The construction of FIG. 11 includes inverters 101, 102, 109, 110, 111, 112; AND gates 103, 104, 105, 106, 113, 114, 115, 116, OR gates 107, 127; encoders 108, 128; block fetch address register valid flag registers (BFAR0-VAL~BFAR3-VAL) 117, 119, 121, 123; block fetch code output registers (BFAR0-CODE~BFAR3-CODE) 118, 120, 122, 124; a main storage request signal output register 125; and a request identifier output register 126.

The operand B-cycle operand signal (OP-B-OP), the operand B-cycle prefetch signal (OP-B-PR), the operand B-cycle translation signal (OP-B-TR), and the instruction B-cycle instruction signal (IF-B-IF), are applied, respectively, to one terminal of each of the AND gates 103, 104, 105 and 106. The output of the operand directory matching register (OP-DMR) 21 is applied after inverted at the inverter 101 to the other terminal of each of the AND gates 103, 104, and 105, and the output of the instruction directory matching register (IF-DMR) 25 is applied after inverted at the inverter 102 to the other terminal of the AND gates 106. By this construction, each output of the AND gates 103, 104, 105 and 106, becomes active, when a miss-hit occurs with regard to a corresponding data fetch request, respectively.

Each output of the AND gates 103, 104, 105 and 106 is applied to both of the OR gate 107 and the encoder 108, and therefore, the output of the OR gate 107 becomes active when a B-cycle process is in operation for a block fetch for any data fetch request. The encoder 108 encodes the four inputs, accordingly, the output of the encoder 108 is a code signal showing the type of data fetch request, the process for which is in the B-cycle, for which a block fetch is required because a miss-hit has occurred at the cache.

The output of the encoder 108 is applied to the four registers, i.e., the corresponding input terminals of the block fetch code output registers BFAR0-CODE~BFAR3-CODE 118, 120, 122, 124.

The block fetch address register valid flag registers (BFAR0-VAL~BFAR3-VAL) 117, 119, 121, 123, and the block fetch code output registers (BFAR0-CODE~BFAR3-CODE) 118, 120, 122, 124 are respectively provided corresponding to the (data) read-in ports in the storage control unit (Su) 1B.

The output of the OR gate 107 is applied to one input terminal of each of the AND gates 113, 114, 115, 116, and the output of each of the AND gates 113, 114, 115, 116 is applied to the data input terminal of the corresponding one of the block fetch address register valid flag registers (BFAR0-VAL~BFAR3-VAL) 117, 119, 121, 123. The output of each block fetch address register valid flag register (BFAR0-VAL~BFAR3-VAL) 117, 119, 121, 123 shows the availability of the corresponding data read-in port in the storage control unit (Su) 1B, i.e., the output of the block fetch address register valid flag register BFARi-VAL (i=0~3) is "1" when the corresponding data read-in port in the storage control unit (Su) 1B is in use for a block fetch.

The output of the block fetch address register valid flag register (BFAR0-VAL) 117 is applied to another terminal of the AND gate 113, after being inverted by the inverter 109. The output of the block fetch address register valid flag register (BFAR0-VAL) 117 is applied directly to another terminal of the AND gate 114, and the output of the block fetch address register valid flag register (BFAR1-VAL) 119 is applied to the other terminal of the AND gates 115, after being inverted by the inverter 110. The output of the block fetch address register valid flag register (BFAR0-VAL) 117 and the output of the block fetch address register valid flag register (BFAR1-VAL) 119 are applied to another two terminals of the AND gate 115, and the output of the block fetch address register valid flag register (BFAR2-VAL) 121, is applied to the other terminal of the AND gate 115 after being inverted by the inverter 110. And the output of the block fetch address register valid flag register (BFAR0-VAL) 117, the output of the block fetch address register valid flag register (BFAR1-VAL) 119 and the output of the block fetch address register valid flag register (BFAR2-VAL) 121 are applied to another three terminals of the AND gate 116, and the output of the block fetch address register valid flag register (BFAR3-VAL) 123 is applied to the other terminal of the AND gate 116 after being inverted by the inverter 112.

The output of each of the AND gates 113, 114, 115, 116 is applied to a set signal input terminal of the corresponding one of the block fetch address register valid flag registers (BFAR0-VAL~BFAR3-VAL) 117, 119, 121, 123 as a set signal, and is also applied to a control signal input terminal of the corresponding block fetch code output register (BFAR0-VAL~BFAR3 CODE) 118, 120, 122, 124. Each of the block fetch address register valid flag registers (BFAR0-VAL~BFAR3-VAL) 117, 119, 121, 123 is set when the above set signal becomes active, and is reset when receiving a corresponding block fetch end signal (BFAR0-BF-END~BFAR3-BF-END) at the corresponding reset signal input terminal. The output of the encoder 108, i.e., the code applied to the data input terminal, is latched in each of the block fetch code output registers (BFAR0-CODE~BFAR3-CODE) 118, 120, 122, 124 when the signal applied to the control signal input terminal becomes active.

The OR gate 127 and the encoder 128 receive all the output signals from the four AND gates 113, 114, 115 and 116. The output of the OR gate 127 is active when any of the outputs of the AND gates 113 is active, and is applied to the main storage request signal output register 125. The main storage request signal output register 125 outputs the main storage request signal (MS-REQ) to the memory control unit (MCU) 2.

The encoder 128 encodes the four input signals applied thereto, and the output of the encoder 128 is applied to the request identifier output register 126. The output of the encoder 128 is the request identifier (REQ-ID) to be sent to the memory control unit (MCU) 2.

As readily understood, in the above-mentioned construction, the availability of each read-in port of the storage control unit (Su) 1B can be realized by the output of the corresponding one of the block fetch address register valid flag registers (BFAR0-VAL~BFAR3-VAL) 117, 119, 121, 123, and the type of data fetch request for which each read-in port of the storage control unit (Su) 1B is in use is realized by the output of the corresponding one of the block fetch code output registers (BFAR0-CODE~BFAR3-CODE) 118, 120, 122, 124.

According to the above-mentioned construction, the read-in ports are used in the order BFAR0→BFAR1→BFAR2→BFAR3, and when all of the ports are in use, all of the outputs of the block fetch address register valid flag registers 117, 119, 121, 123 are "1", and all of the outputs of the AND gates 113, 114, 115, 116 are "0". Therefore, the output of the OR gate 127 is non-active, and thus, a main storage request signal (MS-REQ) is not sent to the memory control unit (MCU) 2.

Figure 12:
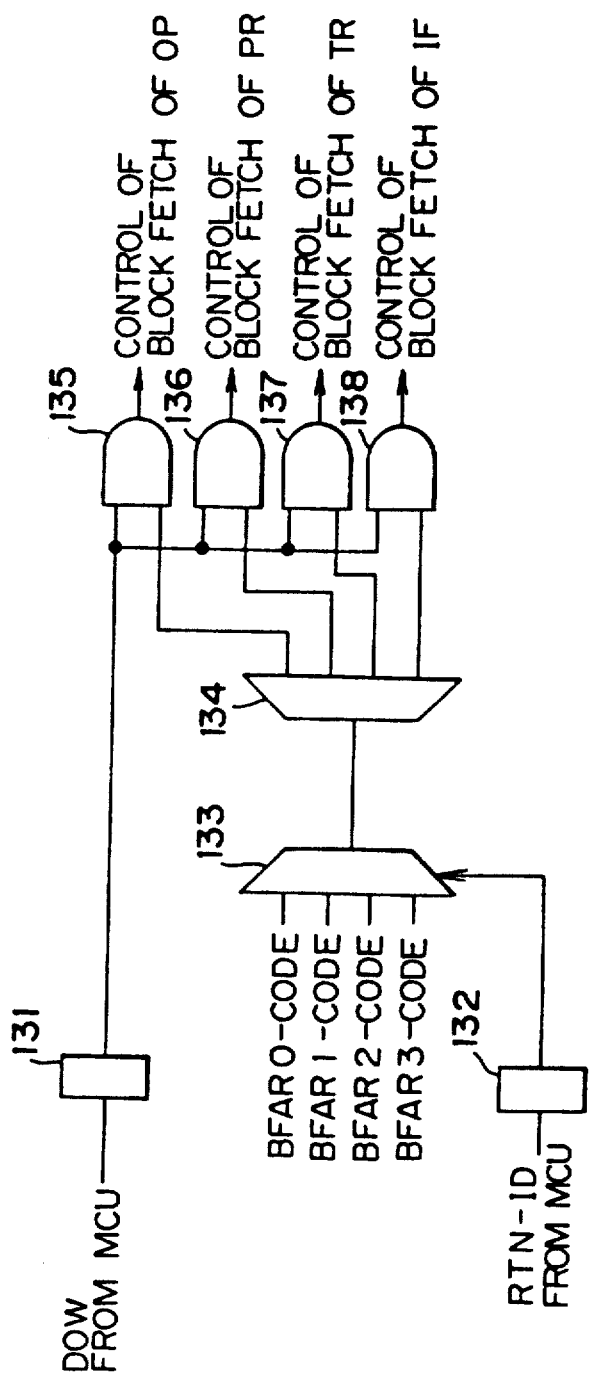

FIG. 12 shows the construction of another part of the block fetch controller "BF-CNTL" 100, for recognizing the type of data fetch for which a block of data is transferred.

The construction of FIG. 12 includes: a DOW input register 131; an RTN-ID input register 132; a data selector-encoder 133; a decoder 134; and AND gates 135, 136, 137, 138.

The DOW input register 131 receives the data-out warning signal (DOW) and outputs it to one input terminal of each of the AND gates 135, 136, 137, 138. The RTN-ID input register 132 receives the return identifier (RTN-ID) and outputs it to the control signal input terminal of the encoder 133. All of the outputs of the block fetch code output registers (BFAR0-CODE~BFAR3-CODE) 118, 120, 122, 124 are applied to the data input terminals of the data selector-encoder 133.

As mentioned before, the return identifier (RTN-ID), which is sent from the memory control unit (MCU) 2, 3τ before the corresponding block fetch data is transferred, indicates the data read-in port to be used for the data fetch request in response to which the corresponding block fetch data are transferred. Therefore, in the data selector-encoder 133, one of the outputs of the block fetch code output registers (BFAR0-CODE~BFAR3-CODE) 118, 120, 122, 124, which corresponds to the data fetch request, in response to which the data and the return identifier (RTN-ID) are transferred, is selected. The selected output of the block fetch code output registers (BFAR0-CODE~BFAR3-CODE) 118, 120, 122, 124 shows the type of the data fetch request in response to which the data are transferred from the memory control unit (MCU) 2.

The output of the data selector-encoder 133 is applied to the decoder 134. The decoder 134 decodes the input signal, and each of four outputs of the decoder 134 is applied to the other input terminal of the corresponding AND gate 135, 136, 137, 138. Each of the output terminals of the decoder 134 corresponds to the type of the data fetch, i.e., operand fetch, prefetch, address translation fetch, and instruction fetch. Therefore, each of the AND gates 135, 136, 137, 138 also corresponds to a respective type of data fetch, and thus one output of the AND gates 135, 136, 137, 138, which corresponds to the type of the data fetch in response to which the data is transferred from the memory control unit (MCU) 2, becomes active.

Figure 13A:
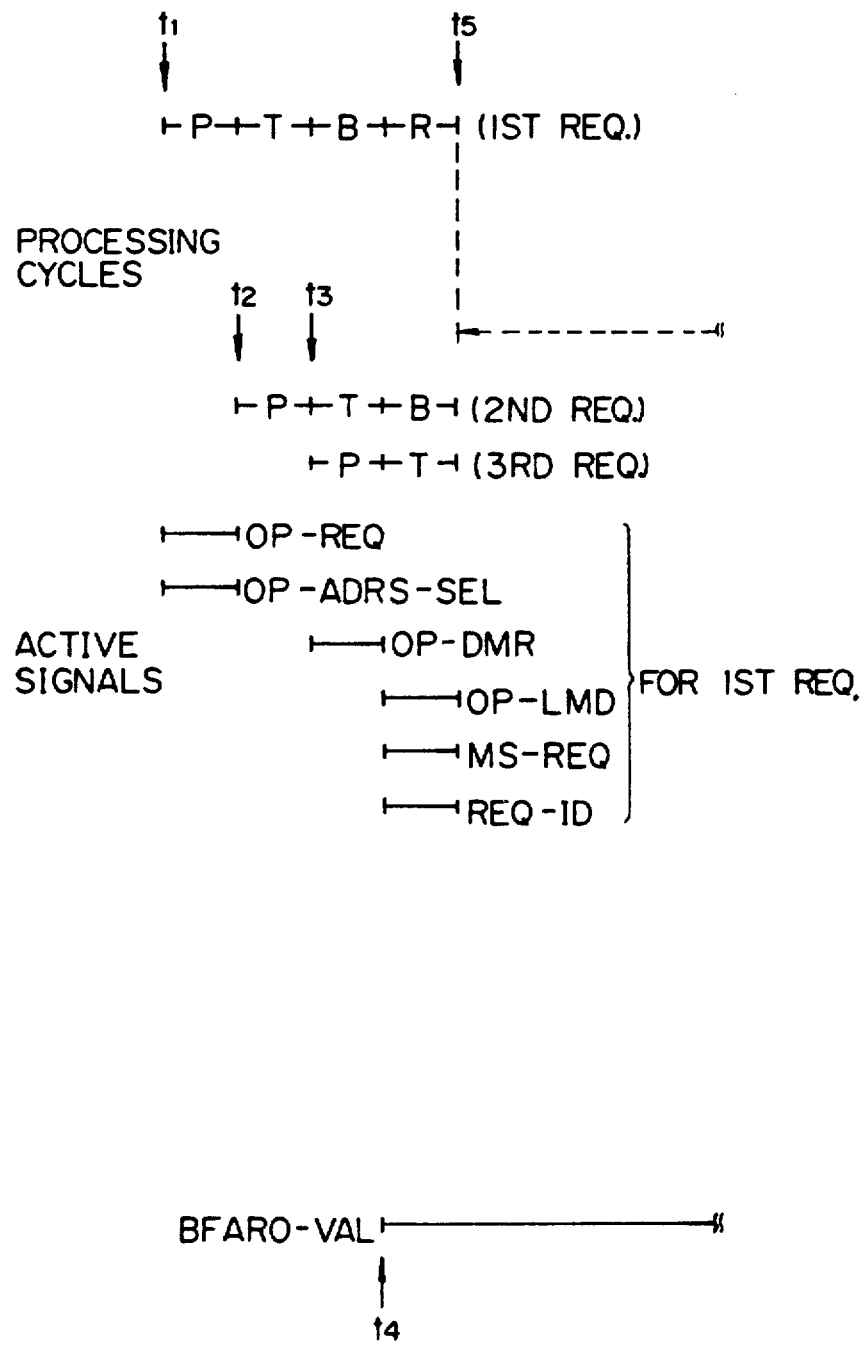
Figure 13B:
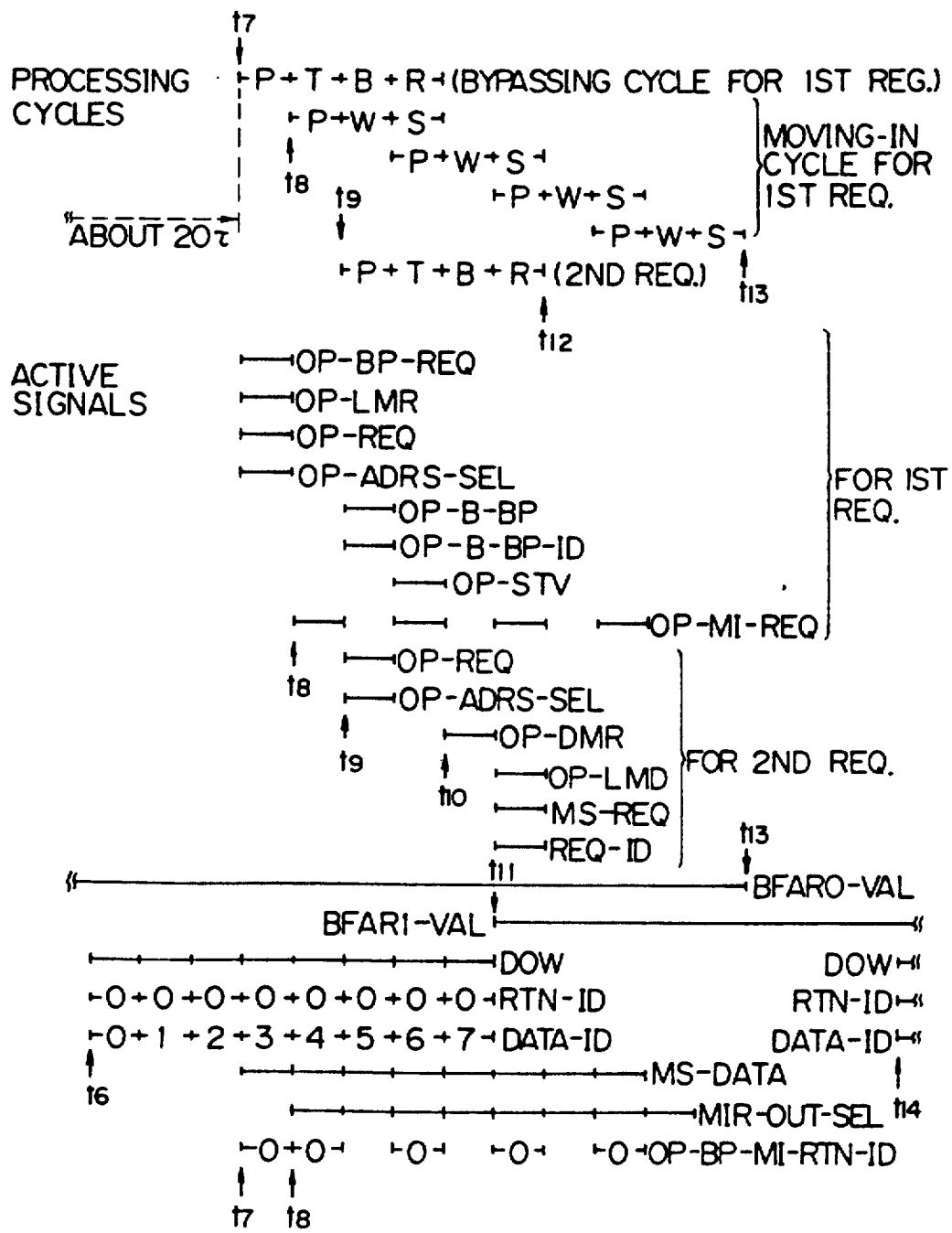

FIGS. 13A, 13B, and 13C show a timing relationship of the processing cycles and the main signals in the cache system according to the present invention, as shown in FIG. 6A, 6B, 7, 8, 9, 10, 11, and 12.

Similar to the case of the conventional cache system, in FIG. 6A an instruction fetch request is output from the instruction unit (Iu) 1A in each cycle. As shown in FIG. 13A, at the time $t_1$, the first operand fetch request (OP-REQ) is output, and then at the time $t_2$, the second operand fetch request (OP-REQ) of the same type, i.e., i.e., an operand fetch request, is output, and at the time $t_3$, the third operand fetch request (OP-REQ) is output.

As readily understood from the construction shown in FIGS. 6A and 6B, because the processing of the data fetch request for the same type of the request, can not be executed at the same time in each section of the construction in FIGS. 6A and 6B, the processing cycle for the second operand fetch request (OP-REQ) stops at the B-cycle at the time $t_5$, And the processing cycle for the third operand fetch request (OP-REQ) stops at T-cycle at the time $t_5$.

As understood by comparing FIGS. 13A, 13B, and 13C with FIGS. 5A, 5B, and 5C, which show the timing relationship of the processing cycles and the main signals in the conventional cache system, from time $t_1$ to $t_7$, there is no difference between the timing relationship in the cache system according to the present invention and that in conventional cache system; except that, at the time $t_4$, i.e., at the timing of the output of the operand fetch line missing detect signal (OP-LMD), the block fetch address register valid signal (BFAR0-VAL) instead of the operand block fetch address register valid signal (OP-BFAR-VAL) becomes active, and that the return identifier (RTN-ID) has a different kind of information from that held by the return identifier (RTN-ID) in conventional system has, as mentioned before.

At the time $t_1$, corresponding to the first operand fetch request (OP-REQ), the operand address select signal (OP-ADRS-SEL) for selecting the corresponding operand fetch request address signal (OP-REQ-ADRS) at the operand address selector 8 in FIG. 6A is output. After the search of the operand cache directory 13, at the time $t_3$, the result of the search is held in the operand directory matching register (OP-DMR) 21.

FIG. 13A shows the case where a miss-hit occurred, wherein, in the following R-cycle, the operand fetch line missing detect signal (OP-LMD) is sent to the instruction unit (Iu) 1A, and the main storage request signal (MS-REQ) and the request identifier (REQ-ID) are sent to the memory control unit (MCU) 2. Corresponding to the beginning of the block fetch, the first block fetch address register valid signal (BFAR0-VAL) becomes active at the time $t_4$. About 20 cycles (20 $\tau$) after the time that the above the main storage request signal (MS-REQ) and the request identifier (REQ-ID) are output, i.e., at the time $t_7$, the transfer of the corresponding block of data MS-DATA from the memory control unit (MCU) 2 begins.

As mentioned before, the data out warning signal (DOW), the return identifier (RTN-ID), and the data identifier (DATA-ID) are output from the main storage (MS) 3, 3 cycles (3 $\tau$) before the data (MS-DATA) is output, beginning at the time $t_6$. In FIG. 13B, the return identifier (RTN-ID) is "0", which denotes the first read-in port is to be used for this data transferred from the main storage (MS) 3 through the memory control unit (MCU) 2, instead of showing the type of data fetch request as in the conventional cache system. Further, as mentioned above, three cycles (3 $\tau$) after the time that the first data out warning signal (DOW) is output, i.e., at the timing of the beginning of the transfer of the data (MS-DATA), the corresponding operand line missing release signal (OP-LMR) is output to the instruction unit (Iu) 1A, and accordingly, the instruction unit (Iu) 1A again sends the operand fetch request (OP-REQ) to the storage control unit (Su) 1B. The operand address select signal (OP-ADRS-SEL) is then output to the operand address selector 8 in FIG. 6A and 6B, to select the output of the first block fetch address register (BFAR0) 35 as an address to be applied to the operand T-cycle effective address register (OP-TEAR) 11 in FIG. 6A.

Regarding the bypassing operation, at the timing of the beginning of the transfer of the data (MS-DATA), i.e., at the time $t_7$, the operand bypass request (OP-BP-REQ) is generated, and thus the bypassing operation of the transferred data is begun. For the bypassing operation, at the time $t_7$, the operand bypass move-in return identifying signal (OP-BP-MI-RTN-ID), which is "0" for selecting the output of the first block fetch address register (BFAR0) 35 as an address to be output from the operand address selector 8, is output, and at the time $t_9$, the operand B-cycle bypass signal (OP-B-BP) and the operand B-cycle bypass identifying signal (OP-B-BP-ID) are output.

At the time $t_8$, an operand move-in request (OP-MI-REQ) to start the moving-in process for the transferred data, and the operand move-in output select signal (OP-MIR-OUT-SEL) to control the selection in the operand move-in register output selector for even-numbered sets of data 78 and the operand move-in register output selector for odd-numbered sets of data 79 in FIG. 7, are output from the logic circuit "BF-CNTL". The moving-in cycle of the transferred data, which consists of 4 P-, W-, and S-cycles, is executed during the time interval of from $t_8$ to $t_{11}$. The abovementioned operand bypass move-in return identifying signal (OP-BP-MI-RTN-ID), which is "0" for selecting the output of the first block fetch address register (BFAR0) 35 as an address to be output from the operand address selector 8, and is output again at every timing of the 4 P-cycle processes in the moving-in operation.

The operation of the second operand fetch request begins at the time $t_9$, without interrupting the operation for the first operand fetch request. Accordingly, at the time $t_9$, in P-cycle, the operand fetch request (OP-REQ) is output again, and at this time, to select the operand fetch request address signal (OP-REQ-ADRS) in the operand address selector 8 in FIG. 6A, the operand address selection signal (OP-ADRS-SEL) is output. Then at the time $t_{10}$, in the B-cycle, the result of the search of the operand cache directory 13 is set to the operand directory matching register (OP-DMR) 21.

FIG. 13B shows the case wherein a miss-hit has occurred again at this time, and therefore, at the time $t_{11}$, in the R-cycle, the operand fetch line missing detect signal (OP-LMD) is sent to the instruction unit (Iu) 1A. According to the present invention, even during the operation for the first operand fetch request, i.e., even if the i-th (i=0, 1, 2, 3) block fetch address register valid signal (BFARi-VAL) is active, the block fetch request for the next i+1-th data fetch request of the same type can be sent to the memory control unit (MCU) 2 using the next read-in port corresponding to the next block fetch address register (BFARi+1). Therefore, at the same time as the operand fetch line missing detect signal (OP-LMD) is sent to the instruction unit (Iu) 1A, the main storage request signal (MS-REQ) and the request identifier (REQ-ID) are sent to the memory control unit (MCU) 2, and the block fetch address register valid signal (BFAR1-VAL) becomes active.

In the same manner as the operation for the first data fetch request, it takes about 20 cycles to receive the data fetched in response to the block fetch request, from the memory control unit (MCU) 2 (or the main storage (MS) 3). Accordingly, referring to FIG. 13C, at the time $t_{14}$, the data-out warning signal (DOW), the return identifier (RTN-ID), and the data identifier (DATA-ID) for the second data fetch request, are sent from the memory control unit (MCU) 2.

Three cycles (3 $\tau$) after the above first data-out warning signal (DOW) is output, at the time $t_{15}$, the bypassing cycle for the second data fetch request is begun, and one cycle (1 $\tau$) after the beginning of the bypassing cycle, at the time $t_{16}$, the 4 move-in cycles for the second data fetch request are begun. The details of the operation are same as for the first data fetch request, except that, at this time, the return identifier (RTN-ID) and the operand bypass move-in return identifying signal (OP-BP-MI-RTN-ID) are "1", which denotes that the second read-in port corresponding to the block fetch address output register (BFAR1) 120 is in use.

As shown in FIG. 13C, the interval from the end of the move-in cycles for the first data fetch request ends, i.e., $t_{13}$, to the time that the bypassing cycles for the second data fetch request begins, i.e., $t_{15}$, is about 4 cycles (4 $\tau$). This indicates that the efficiency of successive block fetch of the same type is much improved in this embodiment of the present invention.

As stated above and shown in FIGS. 13A, 13B, and 13C, in the cache system according to the present invention, even during the operation of a block fetch for the first data fetch request, the operation of a block fetch for a second data fetch request of the same type as the first data fetch request can be started. Thus, the cache system according to the present invention operates efficiently even when a block fetch of the same type as the previous block fetch is requested.

We claim:
1. A data processing system, comprising:
 main memory means for storing data;
 a bus connected to said main memory means; and
 a central processing unit, operatively connected to said bus, for processing data, said central processing unit including at least
 cache means, having at least one cache memory, for storing data;
 instruction executing means for producing a plurality of types of data fetch requests and for executing an instruction using data fetched in response to the data fetch requests;
 a plurality of read-in ports, each operatively connected to said bus and the at least one cache memory, for data to be transferred from said main memory means to the at least one cache memory therethrough;
 cache hit determining means for determining whether data requested by said instruction executing means is held in the at least one cache memory;
 availability status indicating means for indicating statuses of said read-in ports to determine availability of each of said read-in ports;
 read-in port determining means for determining that one of said read-in ports is unoccupied with transferring data from said main memory means to the at least one cache memory when data requested by said instruction executing means is not held in said cache means, without regard to the type of data requested; and
 read-in ports control means for controlling said plurality of read-in ports so that more than one data transfer operation in response to more than one data fetch request can be carried out concurrently using more than one of said plurality of read-in ports each initially determined to be unoccupied by said read-in port determining means.

2. A data processing system according to claim 1, wherein said instruction executing means produces a fetch type indicating signal together with each of the data fetch requests, the fetch type indicating signal indicating the type of each data fetch request, and
 wherein said central processing unit further comprises:
 fetch type signal gating means for receiving the fetch type indicating signal and the output of said cache hit determining means, and for outputting the fetch type indicating signal to a next stage when the output of said cache hit determining means indicates that the data for the data fetch request is not held in said cache means; and
 fetch type storing means for receiving an output of said fetch type signal gating means, and for storing the type of the data fetch request for each of said read-in ports during a data transfer operation through said read-in ports.

3. A data processing system according to claim 2, wherein said central processing unit further comprises:
 memory fetch request sending means for receiving the data fetch request from said instruction executing means, and the output of said cache hit determining means and an output of said availability status indicating means, and for sending a memory fetch request corresponding to the data fetch request to said main memory means when the output of said cache hit determining means indicates that the data requested by the data fetch request is not held in said cache means, and the output of said availability status indicating means indicates that one of said read-out ports is available for the data fetch request;

port-ID sending means for sending a port-ID containing information on said read-in ports to be used in a data transfer operation for the memory fetch request;

return-ID receiving means for receiving a return-ID; and fetch type determining means for determining the type of data fetch request corresponding to the return-ID, wherein said main memory means comprises:

data transfer means for transferring therefrom data requested by the memory fetch request when receiving the memory fetch request; and return-ID sending means for sending the return-ID, including the same information as the port-ID, back to said central processing unit preceding the data transfer corresponding to the port-ID, and wherein said fetch type determining means determines the type of data fetch request corresponding to the return-ID based on the return-ID and the type of data fetch request stored in said fetch type storing means.

4. A data processing system according to claim 1, wherein said read-in ports are arranged according to a predetermined priority of use, and wherein said read-in port determining means comprises port identifying means for receiving an output of said cache hit determining means and for outputting an in-service signal corresponding to one of said read-in ports when the output of said cache hit determining means indicates that the data requested is not held in said cache means, the one of said read-in ports is not in use, and all of said read-in ports having a higher priority than the one of said read-in ports are in use.

5. A data processing system according to claim 4, wherein said instruction executing means produces a fetch type indicating signal together with each of the data fetch requests, the fetch type indicating signal indicating the type of each data fetch request, and wherein said central processing unit further comprises:

fetch type signal gating means for receiving the fetch type indicating signal and the output of said cache hit determining means, and for outputting the fetch type indicating signal to a next stage when the output of said cache hit determining means indicates that the data for the data fetch request is not held in said cache means; and fetch type storing means for receiving an output of said fetch type signal gating means, and for storing the type of the data fetch request for each of said read-in ports during a data transfer operation through said read-in ports.

6. A data processing system according to claim 5, wherein said central processing unit further comprises:

memory fetch request sending means for receiving the data fetch request from said instruction executing means, and the output of said cache hit determining means and an output of said availability status indicating means, and for sending a memory fetch request corresponding to the data fetch request to said main memory means when the output of said cache hit determining means indicates that the data requested by the data fetch request is not held in said cache means, and the output of said availability status indicating means indicates that one of said read-out ports is available for the data fetch request;

port-ID sending means for sending a port-ID containing information on said read-in ports to be used in a data transfer operation for the memory fetch request;

return-ID receiving means for receiving a return-ID;

fetch type determining means for determining the type of data fetch request corresponding to the return-ID, wherein said main memory means comprises:

data transfer means for transferring therefrom data requested by the memory fetch request when receiving the memory fetch request; and return-ID sending means for sending the return-ID, including the same information as the port-ID, back to said central processing unit preceding the data transfer corresponding to the port-ID, and wherein said fetch type determining means determines the type of data fetch request corresponding to the return-ID based on the return-ID and the type of data fetch request stored in said fetch type storing means.

7. A data processing system according to claim 1, wherein said availability status indicating means comprises a plurality of reserved flag registers, each reserved flag register corresponding to one of said read-in ports to indicate availability of each of said read-in ports.

8. A data processing system according to claim 7, wherein said read-in ports are arranged according to a predetermined priority of use, and wherein said read-in port determining means comprises flag setting means for receiving an output of said cache hit determining means and for outputting a set signal to set a reserved flag in one of said reserved flag registers when the output of said cache hit determining means indicates that the data requested is not held in said cache means, the one of said reserved flag registers is not set to reserved, and all of said reserved flag registers corresponding to said read-in ports having a higher priority than the one of said reserved flag registers are set to reserved.

9. A data processing system according to claim 8, wherein said instruction executing means produces a fetch type indicating signal together with each of the data fetch requests, the fetch type indicating signal indicating the type of each data fetch request, and wherein said central processing unit further comprises:

fetch type signal gating means for receiving the fetch type indicating signal and the output of said cache hit determining means, and for outputting the fetch type indicating signal to a next stage when the output of said cache hit determining means indicates that the data for the data fetch request is not held in said cache means; and fetch type storing means for receiving an output of said fetch type signal gating means, and for storing the type of data fetch request for each of said read-in ports during a data transfer operation through said read-in ports.

10. A data processing system according to claim 9, wherein said central processing unit further comprises:

memory fetch request sending means for receiving the data fetch request from said instruction executing means, and the output of said cache hit determining means and an output of said availability status indicating means, and for sending a memory fetch request corresponding to the data fetch request to said main memory means when the output of said cache hit determining means indicates that the data requested by the data fetch request is not held in said cache means, and the output of said availability status indicating means indicates that one of said read-out ports is available for the data fetch request;

port-ID sending means for sending a port-ID containing information on said read-in ports to be used in a data transfer operation of the memory fetch request;

return-ID receiving means for receiving a return-ID; and fetch type determining means for determining the type of data fetch request corresponding to the return-ID, wherein said main memory means comprises:

data transfer means for transferring therefrom data requested by the memory fetch request when receiving the memory fetch request; and return-ID sending means for sending the return-ID, including the same information as the port-ID, back to said central processing unit preceding the data transfer corresponding to the port-ID, and wherein said fetch type determining mean determines the type of data fetch request corresponding to the return-ID based on the return-ID and the type of data fetch request stored in said fetch type storing means.

* * * * *